US012067914B2

(12) United States Patent
Park et al.

(10) Patent No.: US 12,067,914 B2
(45) **Date of Patent: *Aug. 20, 2024**

(54) DISPLAY APPARATUS AND CONTROL METHOD THEREOF

(71) Applicant: SAMSUNG ELECTRONICS CO., LTD., Suwon-si (KR)

(72) Inventors: Seungho Park, Suwon-si (KR); Guiwon Seo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/230,818

(22) Filed: Aug. 7, 2023

(65) Prior Publication Data

US 2023/0386377 A1 Nov. 30, 2023

Related U.S. Application Data

(63) Continuation of application No. 17/860,218, filed on Jul. 8, 2022, now Pat. No. 11,961,435, which is a (Continued)

(30) Foreign Application Priority Data

Jul. 9, 2021 (KR) ........................ 10-2021-0090162
Jan. 17, 2022 (KR) ........................ 10-2022-0006772

(51) Int. Cl.
*G09G 3/00* (2006.01)
*G09G 3/32* (2016.01)

(52) U.S. Cl.
CPC ............... *G09G 3/007* (2013.01); *G09G 3/32* (2013.01); *G09G 2320/0257* (2013.01); *G09G 2320/045* (2013.01); *G09G 2320/046* (2013.01)

(58) Field of Classification Search
CPC .. G09G 3/007; G09G 3/32; G09G 2320/0257; G09G 2320/045;
(Continued)

(56) References Cited

U.S. PATENT DOCUMENTS 7,719,530 B2 5/2010 Ono
9,330,623 B2 5/2016 Lee et al.
(Continued)

FOREIGN PATENT DOCUMENTS

JP 2005-25161 1/2005
JP 2005-257725 A 9/2005
(Continued)

OTHER PUBLICATIONS

International Search Report dated Oct. 17, 2022 in International Patent Application No. PCT/KR2022/008585 (3 pages; 3 pages English translation).
(Continued)

*Primary Examiner* — Andrew Sasinowski
(74) *Attorney, Agent, or Firm* — STAAS & HALSEY LLP

(57) ABSTRACT

A display apparatus including a display, a memory configured to store moving trajectory information related to a plurality of moving trajectories. and a processor configured to control the display to display a specific pixel which is pixel-shifted according to a first moving trajectory among the plurality of moving trajectories in a plurality of image frames included in a first frame interval. The processor, based on completing of the specific pixel being pixel-shifted according to the first moving trajectory, moves the specific pixel located at a starting point of the first moving trajectory by pixel units in any one of a vertical direction and a horizontal direction, and control the display to display the specific pixel by being pixel-shifted according to a second
(Continued)

moving trajectory among the plurality of moving trajectories in a plurality of image frames included in a second frame interval.

20 Claims, 24 Drawing Sheets

Related U.S. Application Data continuation of application No. PCT/KR2022/008585, filed on Jun. 17, 2022.

(58) Field of Classification Search
CPC ..... G09G 2320/046; G09G 2320/0242; G09G 2320/043
See application file for complete search history.

(56) References Cited

U.S. PATENT DOCUMENTS

| | | | |
|---|---|---|---|
| 9,620,047 | B2 | 4/2017 | Lee et al. |
| 10,147,401 | B2 | 12/2018 | Lee et al. |
| 10,529,267 | B2 | 1/2020 | Lee et al. |
| 10,854,123 | B2 | 12/2020 | Kim et al. |
| 11,302,249 | B2 | 4/2022 | Takasugi |
| 2004/0252135 | A1 | 12/2004 | Ono |
| 2016/0078803 | A1 | 3/2016 | Kim |
| 2016/0111034 | A1 | 4/2016 | Lee et al. |
| 2017/0221266 | A1 | 8/2017 | Schubert |
| 2018/0261151 | A1 | 9/2018 | Chung |
| 2019/0027077 | A1 | 1/2019 | Kudo |
| 2019/0066631 | A1 | 2/2019 | Lee et al. |
| 2019/0088178 | A1 | 3/2019 | Ward |
| 2019/0325849 | A1 | 10/2019 | Lee et al. |
| 2020/0211430 | A1 | 7/2020 | Kim et al. |
| 2020/0410930 | A1 | 12/2020 | Tagasugi |
| 2023/0010761 | A1* | 1/2023 | Park ......................... G09G 3/00 |

FOREIGN PATENT DOCUMENTS

| | | |
|---|---|---|
| KR | 10-2016-0034459 | 3/2016 |
| KR | 10-2016-0047072 | 5/2016 |
| KR | 10-2017-0090557 A | 8/2017 |
| KR | 10-2018-0006586 A | 1/2018 |
| KR | 10-2113263 | 5/2020 |
| KR | 10-2020-0079867 | 7/2020 |
| KR | 10-2021-0001887 | 1/2021 |

OTHER PUBLICATIONS

PCT/ISA/237 dated Oct. 17, 2022 in International Patent Application No. PCT/KR2022/008585 (4 pages).

Notice of Allowance dated Mar. 29, 2023 in U.S. Appl. No. 17/860,218.

U.S. Appl. No. 17/860,218, filed Jul. 8, 2022, Seungho Park, Samsung Electronics Co., Ltd.

Extended European Search Report dated Jul. 4, 2024 for corresponding application No. 22837848.5.

* cited by examiner

Step 2 <SECOND FRAME INTERVAL>

Step 4 <FOURTH FRAME INTERVAL>

Step 5 <FIFTH FRAME INTERVAL>

Step 6 <SIXTH FRAME INTERVAL>

Step 7 <SEVENTH FRAME INTERVAL>

VERTICAL DIRECTION MOVEMENT OF SPECIFIC PIXEL

HORIZONTAL DIRECTION MOVEMENT OF SPECIFIC PIXEL

DISPLAY APPARATUS AND CONTROL METHOD THEREOF

CROSS-REFERENCE TO RELATED APPLICATION(S)

This application is a continuation application of U.S. patent application Ser. No. 17/860,218 filed on Jul. 8, 2022, which is a continuation application of International Patent Application No. PCT/KR2022/008585, filed on Jun. 17, 2022, which claims the benefit of Korean Patent Application No. 10-2021-0090162, filed on Jul. 9, 2021, and Korean Patent Application No. 10-2022-0006772, filed on Jan. 17, 2022, in the Korean Intellectual Property Office, the entire disclosures of which are herein incorporated by reference as a part of this application.

BACKGROUND

Field

The disclosure relates to a display apparatus and a control method thereof. More particularly, the disclosure relates to a self-luminous display apparatus and a control method thereof.

Description of Related Art

Recently, various types of display apparatuses have been developed and distributed. Particularly, a self-luminous display apparatus is being actively developed and distributed.

The self-luminous display apparatus may provide a high color reproduction range due to characteristics of the self-luminous element, and may be driven with relatively low power consumption since a light-emitting area of a pixel element is small even in a case of high resolution.

However, there is a problem in that a shadow effect occurs, in which a luminance of a pixel element that continuously emits light among self-luminous elements is different from that of a pixel element that changes from a non-luminous state to a light emitting state. In addition, there are problems such as burn-in or afterimage generation.

For example, when a specific pixel element continuously outputs identical image data, stress applied to the specific pixel element may not be distributed, and deterioration may occur faster than the other pixel elements.

Stress is not concentrated only on a specific pixel element among a plurality of pixel elements constituting the display apparatus even when the display apparatus is used for a long time, and there has been a demand for a way to reduce a difference in remaining pixel element, remaining lifespan, degree of deterioration, degree of burn-in, afterimage, or the like.

The disclosure has been made in accordance with the above-mentioned necessity, and an object of the disclosure is to provide a display apparatus and a method for controlling the same for reducing burn-in and afterimage generation of a pixel element according to the display of an image.

SUMMARY

According to an embodiment of the disclosure, a display apparatus includes a display, a memory configured to store moving trajectory information related to a plurality of moving trajectories, and a processor configured to control the display to display a specific pixel which is pixel-shifted according to a first moving trajectory among the plurality of moving trajectories in a plurality of image frames included in a first frame interval, based on completing of the specific pixel being pixel-shifted according to the first moving trajectory, move the specific pixel located at a starting point of the first moving trajectory by pixel units in any one of a vertical direction and a horizontal direction, and control the display to display the specific pixel which is pixel-shifted according to a second moving trajectory among the plurality of moving trajectories in a plurality of image frames included in a second frame interval.

The processor may set a moving range of the specific pixel based on a location in which the specific pixel is displayed, and based on completing a pixel shift according to any one of the plurality of moving trajectories, move the specific pixel by pixel units in any one of a vertical direction and a horizontal direction within the set moving range.

The processor may pixel-shift the specific pixel in the plurality of image frames included in the first frame interval by pixel units in a first diagonal direction, and based on the pixel-shifted specific pixel reaching the moving range, pixel-shift the specific pixel by pixel units in a second diagonal direction and pixel-shift the specific pixel according to the first moving trajectory.

The processor may pixel-shift the specific pixel in the plurality of image frames included in the second frame interval by pixel units in a third diagonal direction, and based on the pixel-shifted specific pixel reaching the moving range, pixel-shift the specific pixel by pixel units in a fourth diagonal direction and pixel-shift the specific pixel according to the second moving trajectory.

The moving range of the specific pixel may include a horizontal moving range and a vertical moving range set based on the location in which the specific pixel is displayed, and wherein the processor is configured to, based on completing of the specific pixel being pixel-shifted according to the first moving trajectory, move the specific pixel located at the starting point of the first moving trajectory in a horizontal direction within the horizontal moving range, based on completing of the specific pixel being pixel-shifted according to the second moving trajectory, move the specific pixel located at a starting point of the second moving trajectory in the horizontal direction within the horizontal moving range, and pixel-shift the specific pixel according to each of the plurality of moving trajectories corresponding to the moving range, and shift the specific pixel to a respective display location of pixels included in the moving range.

The moving range of the specific pixel may include a horizontal moving range and a vertical moving range set based on the location in which the specific pixel is displayed, and wherein the processor is configured to, based on completing of the specific pixel being pixel-shifted according to the first moving trajectory, move the specific pixel located at the starting point of the first moving trajectory in a vertical direction within the vertical moving range, based on completing of the specific pixel being pixel-shifted according to the second moving trajectory, move the specific pixel located at the starting point of the second moving trajectory in a vertical direction within the vertical moving range, and pixel-shift the specific pixel according to each of the plurality of moving trajectories corresponding to the moving range, and shift the specific pixel to a respective display location of pixels included in the moving range.

The processor may, based on any one of a number of pixels included in the horizontal moving range and a number of pixels included in the vertical moving range of the moving range being an integer multiple, identify a moving trajectory corresponding to the moving range of the specific pixel based on moving trajectory information stored in the memory, and control the display to display the specific pixel which is shifted based on the identified moving trajectories.

Each of the first moving trajectory and the second moving trajectory may be composed of a combination of at least one of a straight line, a rectangle rotated 45 degrees, or a square rotated 45 degrees.

The processor may move the specific pixel only in the horizontal direction or only in the vertical direction within a moving range between a plurality of frame intervals included in an image.

The processor may, based on the second moving trajectory corresponding to a preset moving trajectory, control the display to maintain a location of the moved specific pixel and display the specific pixel in the plurality of image frames included in the second frame interval, and after re-moving the moved specific pixel by pixel units in any one of the vertical direction and the horizontal direction, control the display to display the re-moved specific pixel in a plurality of image frames included in a third frame interval by being pixel-shifted according to a third moving trajectory.

The display may be implemented as a self-luminous display.

According to an embodiment of the disclosure, a method of controlling a display apparatus comprising moving trajectory information related to a plurality of moving trajectories, the method includes controlling the display to display a specific pixel which is pixel-shifted according to a first moving trajectory among the plurality of moving trajectories in a plurality of image frames included in a first frame interval, based on completing of the specific pixel being pixel-shifted according to the first moving trajectory, moving the specific pixel located at a starting point of the first moving trajectory by pixel units in any one of a vertical direction and a horizontal direction, and controlling the display to display the specific pixel which is pixel-shifted according to a second moving trajectory among the plurality of moving trajectories in a plurality of image frames included in a second frame interval.

The method may further include setting a moving range of the specific pixel based on a location in which the specific pixel is displayed, and wherein the moving includes, based on completing a pixel shift according to any one of the plurality of moving trajectories, moving the specific pixel by pixel units in any one of a vertical direction and a horizontal direction within the set moving range.

The controlling the display in the plurality of image frames included in the first frame interval may include pixel-shifting the specific pixel in the plurality of image frames included in the first frame interval by pixel units in a first diagonal direction, and based on the pixel-shifted specific pixel reaching the moving range, pixel-shifting the specific pixel by pixel units in a second diagonal direction and pixel-shift the specific pixel according to the first moving trajectory.

The controlling the display in the plurality of image frames included in the second fame interval may include pixel-shifting the specific pixel in the plurality of image frames included in the second frame interval by pixel units in a third diagonal direction, and based on the pixel-shifted specific pixel reaching the moving range, pixel-shifting the specific pixel by pixel units in a fourth diagonal direction and pixel-shift the specific pixel according to the second moving trajectory.

The moving range of the specific pixel may include a horizontal moving range and a vertical moving range set based on the location in which the specific pixel is displayed, and wherein the moving may include, based on completing of the specific pixel being pixel-shifted according to the first moving trajectory, moving the specific pixel located at the starting point of the first moving trajectory in a horizontal direction within the horizontal moving range, wherein the control method may further include, based on completing of the specific pixel being pixel-shifted according to the second moving trajectory, moving the specific pixel located at a starting point of the second moving trajectory in the horizontal direction within the horizontal moving range, and pixel-shifting the specific pixel according to each of the plurality of moving trajectories corresponding to the moving range, and shift the specific pixel to a respective display location of pixels included in the moving range.

The moving range of the specific pixel may include a horizontal moving range and a vertical moving range set based on the display location of the specific pixel, and wherein the moving may include, based on completing of the specific pixel being pixel-shifted according to the first moving trajectory, moving the specific pixel located at the starting point of the first moving trajectory in a vertical direction within the vertical moving range, and the control method may include, based on completing of the specific pixel being pixel-shifted according to the second moving trajectory, moving the specific pixel located at the starting point of the second moving trajectory in a vertical direction within the vertical moving range, and pixel-shifting the specific pixel according to each of the plurality of moving trajectories corresponding to the moving range, and shifting the specific pixel to a respective display location of pixels included in the moving range.

The method may include, based on any one of a number of pixels included in the horizontal moving range and a number of pixels included in the vertical moving range of the moving range being an integer multiple, identifying a moving trajectory corresponding to the moving range of the specific pixel based on moving trajectory information stored in the memory, and controlling the display to display the specific pixel which is shifted based on the identified moving trajectories.

Each of the first moving trajectory and the second moving trajectory may be composed of a combination of at least one of a straight line, a rectangle rotated 45 degrees, or a square rotated 45 degrees.

The specific pixel may move the specific pixel only in the horizontal direction or only in the vertical direction within a moving range between a plurality of frame intervals included in an image.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
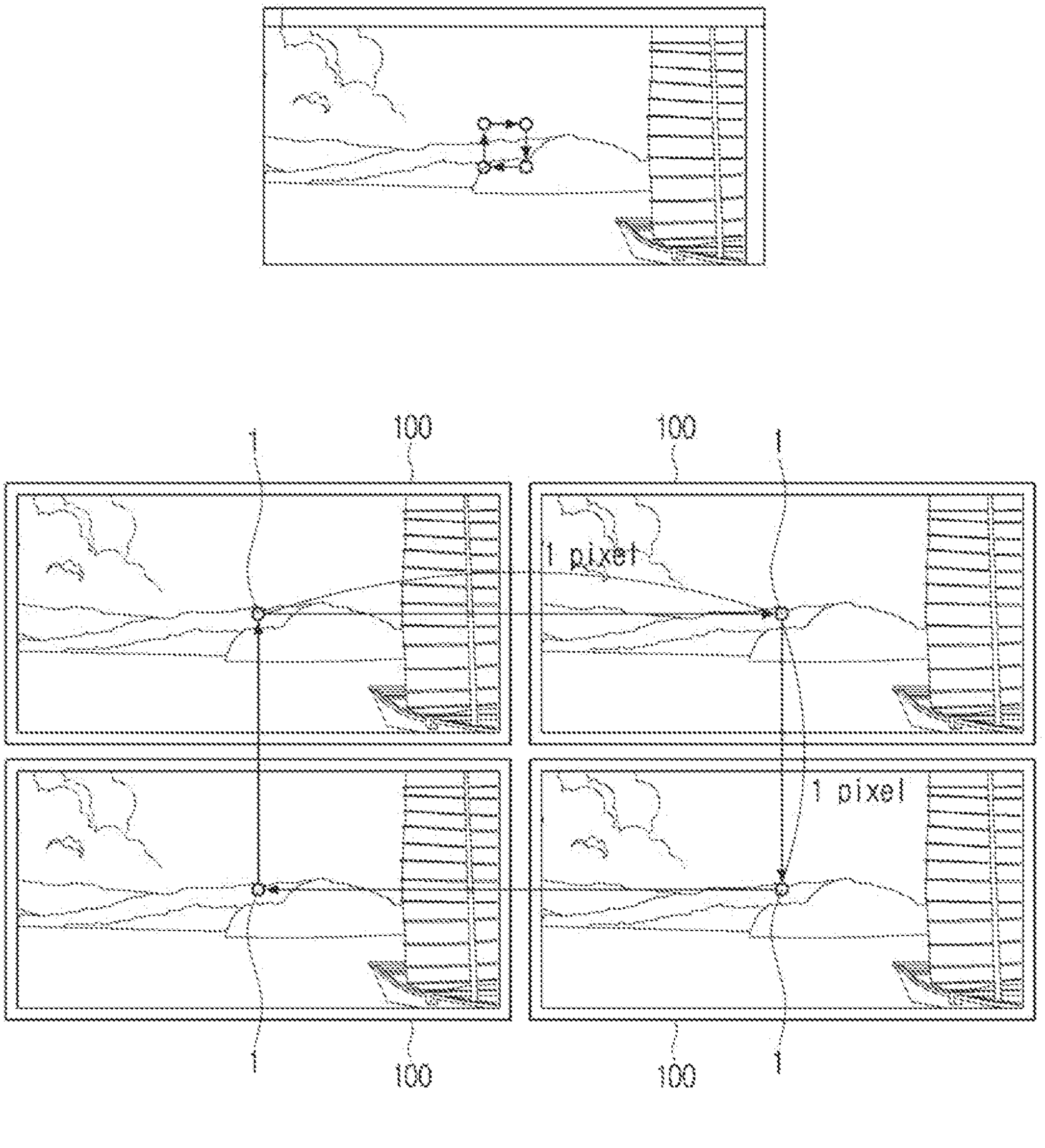
FIG. 1 is a view illustrating a pixel shift according to the related art.

The terms used in describing various example embodiments will be briefly explained, and various example embodiments will be described in greater detail with reference to the accompanying drawings.

Terms used in the disclosure are selected as general terminologies currently widely used in consideration of the configuration and functions of the disclosure, but may be different depending on intention of those skilled in the art, a precedent, appearance of new technologies, or the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is identified that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions may not be described in detail where they would obscure the disclosure with unnecessary detail.

According to various embodiments of the disclosure, stress applied to the pixel element may be dispersed by using the pixel shift, and an afterimage or burn-in phenomenon may be reduced.

By performing the pixel shift according to various movement trajectories, the degree of deterioration of a plurality of pixel elements constituting the display apparatus may be reduced.

FIG. 1 is a view illustrating a pixel shift according to the related art.

In a prior display apparatus, particularly, a self-luminous display apparatus, a specific pixel deteriorates as a driving time increases, and thus a performance thereof may be deteriorated.

For example, an organic light emitting display device has a disadvantage in that burn-in or an afterimage phenomenon appears according to a lifespan of each pixel element constituting the display apparatus. For example, if the display apparatus continuously outputs an identical image for a long time or continuously outputs a logo of a broadcaster (or content) for a long time, deterioration of a specific pixel element may be accelerated and an afterimage may occur.

In order to solve this problem, the display apparatus may move and display the image instead of fixing the image. A method or technique for moving and displaying an image is referred to as a pixel shift.

When the display apparatus displays an image using pixel shift, it may prevent a specific pixel element from outputting the same data (e.g., the same color and luminance) for a long time, and improve deterioration of a specific pixel element. Here, the pixel shift may move the image by 1 pixel in units of several tens of seconds or in a unit of a predetermined frame interval such that the user's eyes cannot easily see it.

However, as illustrated in FIG. 1, with regard to the prior pixel shift, there is a problem in that a moving range of the image or a moving trajectory of the image is somewhat fixed, and the moving range of the image or the moving trajectory of the image is somewhat limited in order to prevent deterioration of a specific pixel element. For example, as illustrated in FIG. 1, even when the image sequentially moves from right to bottom to left to top by pixel units (i.e., 1 pixel), there is a problem in that it is somewhat difficult to distribute a stress of pixel elements constituting the display apparatus, and it is difficult to prevent a specific pixel element from outputting the same data for a long time.

Hereinafter, pixel shift for preventing deterioration of a plurality of pixel elements constituting the display apparatus 100 according to various embodiments of the disclosure will be described.

Figure 2:
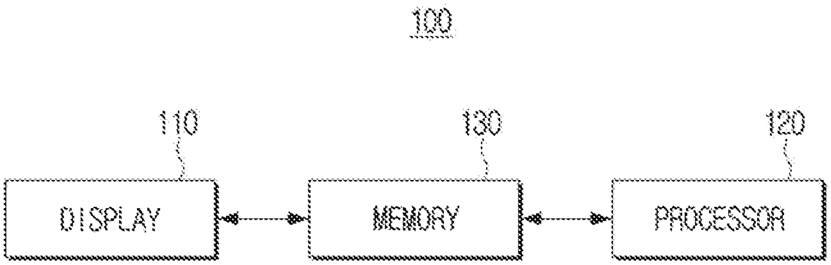
FIG. 2 is a block diagram illustrating a configuration of a display apparatus according to an embodiment.

FIG. 2 is a block diagram illustrating a configuration of a display apparatus according to an embodiment;

The display apparatus 100 may be implemented in various types of a liquid crystal display (LCD), an organic light-emitting diode (OLED), a liquid crystal on silicon (LCoS), a digital light processing (DLP), a quantum dot (QD) display panel, and a quantum dot light-emitting diodes (QLED), or the like.

The display apparatus 100 according to an embodiment of the disclosure includes a display 110, a memory 120, and a processor 130.

The display apparatus 100 according to an embodiment of the disclosure may include a plurality of self-luminous elements. Here, the self-luminous element may be implemented as a light emitting diode (LED), a micro LED or the like. Here, the micro LED may be an LED having a size of about 5 to 100 micrometers, and may be a micro-light emitting diode that emits light without a color filter.

According to an embodiment of the disclosure, the memory 120 may store data necessary for various embodiments of the disclosure. In this case, the memory 120 may be implemented in a form of a memory embedded in the display apparatus 100 or may be implemented in a form of a memory that is detachable to the display apparatus 100 according to a data storage purpose.

For example, data for driving the display apparatus 100 may be stored in a memory embedded in the display apparatus 100, and data for an extended function of the display apparatus 100 may be stored in a memory attached to and detached from the display apparatus 100. Meanwhile, the memory embedded in the display apparatus 100 may be implemented as at least one of a volatile memory (e.g., dynamic RAM (DRAM), static RAM (SRAM), or synchronous dynamic RAM (SDRAM)), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, or a solid state drive (SSD). Also, the memory detachable from the display apparatus 100 may be implemented as a memory card (e.g., compact flash (CF), secure digital (SD), micro secure digital (Micro-SD), mini secure digital (Mini-SD), extreme digital (xD), multi-media card (MMC), etc.), external memory that can be connected to the USB port (e.g., USB memory), or the like.

According to an example, the memory 120 may store at least one instruction for controlling the display apparatus 100 or a computer program including the instructions.

Particularly, the memory 120 may store moving trajectory information i) a moving path of a specific pixel 1 between a plurality of frame intervals, and ii) a moving trajectory of the specific pixel 1 in a specific frame interval among a plurality of frame intervals, corresponding to a moving range of the specific pixel 1.

According to an embodiment, the processor 130 may set a moving range of the specific pixel 1. For example, the processor 130 may set a horizontal moving range and a vertical moving range of the specific pixel 1. As another example, the horizontal moving range and the vertical moving range of the specific pixel 1 may be predetermined.

The processor 130 may acquire moving trajectory information corresponding to a moving range set from plurality of moving trajectory information stored in the memory 120.

The processor 130 may acquire i) a moving path and ii) a moving trajectory of the specific pixel 1 included in the acquired moving trajectory information.

i) The moving path may include a vertical moving path or a horizontal moving path within a moving range of the specific pixel 1 between a plurality of frame intervals constituting the image, and ii) the moving trajectory may include shift path, shift order, shift trajectory, etc. of the specific pixel 1 within one frame interval among a plurality of frame intervals.

The processor 130 may be electrically connected to the memory 120 and control the overall operation of the display apparatus 100.

According to an embodiment, the processor 130 may be implemented as a digital signal processor (DSP), a microprocessor, or a time controller (T-CON) that processes a digital image signal. However, it is not limited thereto, and may include one or more of a central processing unit (CPU), microcontroller unit (MCU), micro processing unit (MPU), controller, application processor (AP), or communication processor (CP), ARM processor, and artificial intelligence (AI) processor or may be defined with a corresponding term. In addition, the processor 130 may be implemented as a system on chip (SoC) or large scale integration (LSI) in which a processing algorithm is embedded, or may be implemented in a field programmable gate array (FPGA) form. The processor 130 may perform various functions by executing computer executable instructions stored in the memory 120.

The processor 130 according to an embodiment may control the display 110 to display an image. The image may be divided into a plurality of frame intervals, and each of the plurality of frame intervals may include a plurality of image frames. For example, the image may be divided into first to tenth frame intervals, and the first frame interval may include first to twenty-fourth image frames. Specific numbers are examples for convenience of description and are not limited thereto.

In addition, the image may refer to a still image that is not divided into a plurality of frame intervals.

While displaying a plurality of image frames included in the first frame interval, the processor may control the display 110 such that a specific pixel in the image is displayed with a pixel shift according to the first moving trajectory based on the moving trajectory information stored in the memory 120.

For example, while displaying a plurality of image frames included in the first frame interval, the processor 130 may pixel-shift the image by moving the specific pixel by pixel units (e.g., by 1 pixel) within a plurality of pixels included in the first moving trajectory at regular time intervals (e.g., tens of seconds) or at regular frame intervals (e.g., predetermined image frame intervals). As the processor 130 moves the specific pixel 1, all of the plurality of pixels constituting the image (or image frame) are moved.

When the pixel shift according to the first moving trajectory is completed, the processor 130 may move a specific pixel located at a starting point of the first moving trajectory in either a vertical direction or a horizontal direction by pixel units.

A detailed description thereof will be described with reference to FIG. 3.

Figure 3:
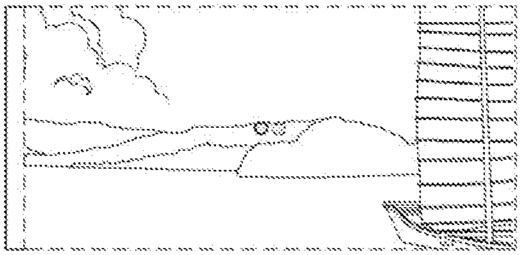
FIG. 3 is a view illustrating a moving range of a specific pixel according to an embodiment.
Figure 3:
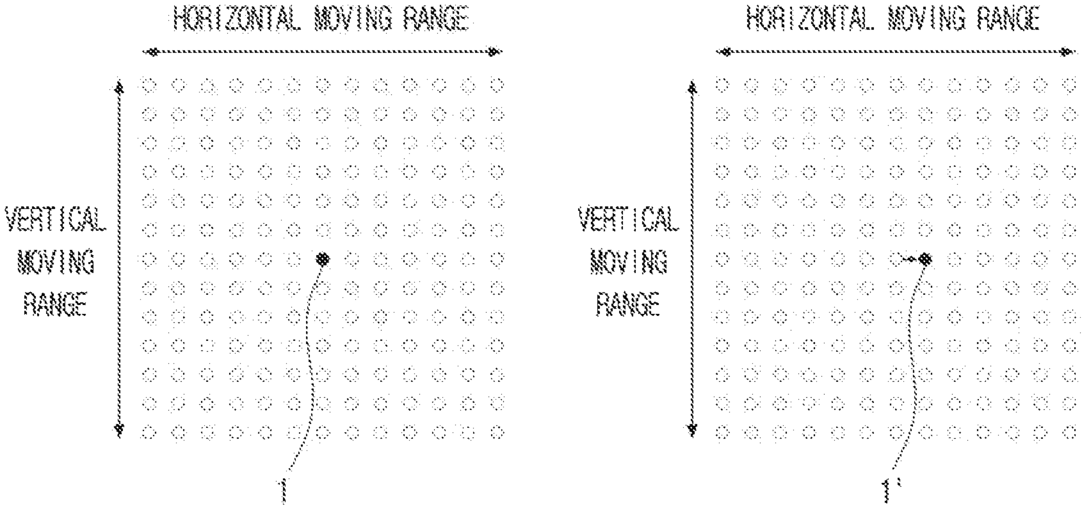

FIG. 3 is a view illustrating a moving range of a specific pixel according to an embodiment.

According to an embodiment of the disclosure, the processor 130 may set (or select, identify) any one of a plurality of pixels in an image as a specific pixel 1. The specific pixel 1 may be referred to as a reference pixel or the like, but will be collectively referred to as the specific pixel 1 for convenience of description.

For example, the processor 130 may arbitrarily select any one of the plurality of pixels and identify it as the specific pixel 1, or select any one located in a center among the plurality of pixels and identify it as the specific pixel 1. As another example, the processor 130 may select any one pixel corresponding to a predetermined location among the plurality of pixels and identify it as the specific pixel 1.

The processor 130 may perform a pixel shift on the image by moving the specific pixel 1. When the processor 130 moves the specific pixel 1, all of the plurality of pixels constituting the image may be moved.

According to an embodiment, the processor 130 may set a moving range of the specific pixel 1 based on the displayed location of the specific pixel 1. As illustrated in FIG. 3, the processor 130 may identify a horizontal moving range and a vertical moving range of the specific pixel 1.

Each of a plurality of circles illustrated in FIG. 3 means one pixel, and it is assumed that the horizontal moving range is 13 pixels and the vertical moving range is 13 pixels of the specific pixel 1 for convenience of description. However, this is an example and is not limited thereto. For example, the moving range of the specific pixel 1 may be variously set, such as a horizontal moving range of 9 pixels and a vertical moving range of 5 pixels.

For example, the horizontal moving range and the vertical moving range of the specific pixel 1 may be different depending on an image, may be different according to the user's setting, and may be different depending on a size of the display 110 provided in the display apparatus 100 or a resolution of the image. For example, the size of the display 110 and a moving range of the specific pixel 1 may have a proportional relationship, and a resolution of content and the moving range of the specific pixel 1 may have a proportional relationship. However, this is merely an example and may be variously changed. For example, since the horizontal moving range and the vertical moving range are the same, the moving range of the specific pixel 1 may have a square shape, and since the horizontal moving range and the vertical moving range are different, the moving range of the specific pixel 1 may have a rectangular shape.

According to an embodiment, the processor 130 may control the display 110 such that the specific pixel 1 is displayed with a pixel shift according to a first moving trajectory in a plurality of image frames included in the first frame interval, and may move, when the pixel shift according to the moving trajectory is completed, the specific pixel 1 located at the starting point of the first moving trajectory by pixel units in either the vertical direction or the horizontal direction within the moving range.

Referring to FIG. 3, the processor 130 pixel-shift the specific pixel 1 according to the first moving trajectory in the first frame interval, and may move, when the pixel shift according to the first moving trajectory is completed, the specific pixel 1 by pixel units in the horizontal direction within the horizontal moving range.

For another example, the processor 130 pixel-shift the specific pixel 1 according to the first moving trajectory in the first frame interval, and may move, when the pixel shift according to the first moving trajectory is completed, the specific pixel 1 by pixel units in the vertical direction within the vertical moving range.

The processor 130 may pixel-shift a specific pixel 1' moved by pixel units in the plurality of image frames included in a second frame interval according to a second moving trajectory.

Hereinafter, a detailed description will be given of a plurality of moving trajectories, a first moving trajectory, and a second moving trajectory with reference to FIGS. 4 to 10.

Figure 4:
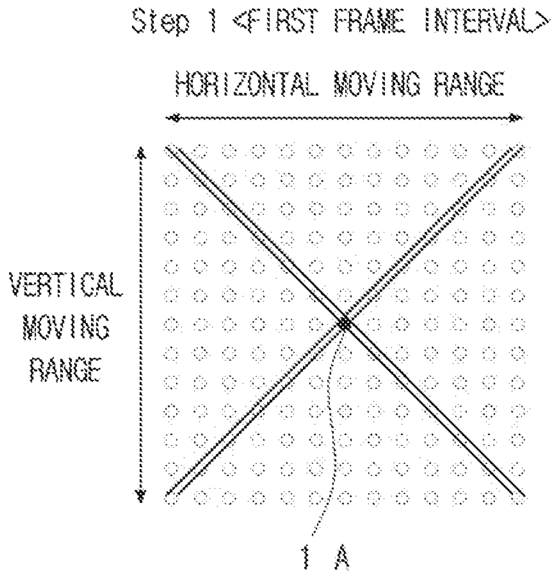
FIG. 4 is a view illustrating a first moving trajectory according to an embodiment.

FIG. 4 is a view illustrating a first moving trajectory according to an embodiment.

The processor 130 may acquire moving trajectory information corresponding to a moving range of the specific pixel 1 among plurality of moving trajectory information stored in the memory 120. For example, the processor 130 may acquire moving trajectory information corresponding to a moving range (e.g., 13×13) having a horizontal moving range of 13 pixels and a vertical moving range of 13 pixels.

The processor 130 may pixel-shift the specific pixel 1 according to a first moving trajectory A based on moving trajectory information in the plurality of image frames included in the first frame interval.

For example, the processor 130 may pixel-shift the specific pixel 1 by pixel units in a first diagonal direction according to the first moving trajectory A in the plurality of image frames included in the first frame interval, and may pixel-shift, when the specific pixel 1 reaches to the moving range, the specific pixel 1 by pixel units in a second diagonal direction to pixel-shift it according to the first moving trajectory A.

Referring to FIG. 4, the processor 130 may pixel-shift the specific pixel 1 in a first diagonal direction (e.g., upper right direction) by pixel units in the plurality of image frames included in the first frame interval. When the specific pixel 1 reaches an upper side of the vertical moving range or a right side of the horizontal moving range, the processor 130 may shift the specific pixel 1 in the second diagonal direction (e.g., lower left direction) by pixel units.

When the specific pixel 1 reaches a lower side of the vertical moving range or a left side of the horizontal moving range, the processor 130 may shift the specific pixel 1 in a third diagonal direction (e.g., lower right direction) by pixel units. When the specific pixel 1 reaches a lower side of the vertical moving range or a right side of the horizontal moving range, the processor 130 may shift the specific pixel 1 in a fourth diagonal direction (e.g., upper left direction) by pixel units.

As illustrated in FIG. 4, when the pixel shift according to the first moving trajectory A is completed as the specific pixel 1 is pixel-shifted by pixel units in the first to fourth diagonal directions, the processor 130 may move the specific pixel 1 by pixel units in any one of a vertical direction and a horizontal direction.

For example, as described in FIG. 3, when the pixel shift according to the first moving trajectory A of the specific pixel 1 is completed, the processor 130 may move the specific pixel 1 in the horizontal direction within the horizontal moving range.

For another example, when the pixel shift according to the first moving trajectory A of the specific pixel 1 is completed, the processor 130 may move the specific pixel 1 in the vertical direction within the vertical moving range. When the pixel shift according to the first moving trajectory A is completed, the specific pixel 1 may be located at a starting point of the first moving trajectory A.

Figure 5:
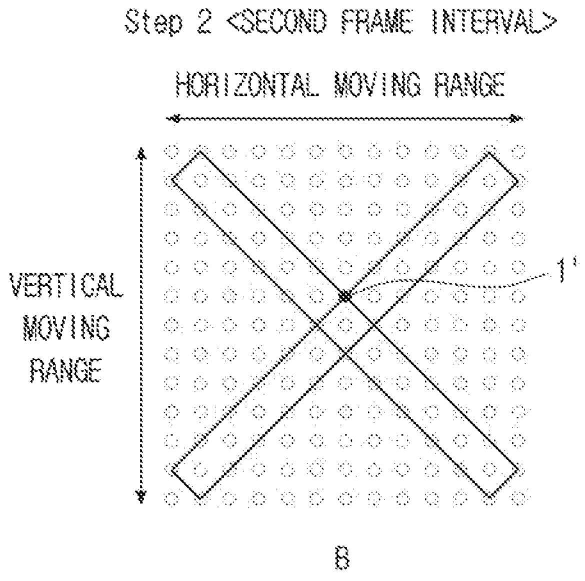
FIG. 5 is a view illustrating a second moving trajectory according to an embodiment.

FIG. 5 is a view illustrating a second moving trajectory according to an embodiment.

When comparing FIG. 4 and FIG. 5, when the pixel shift according to the first moving trajectory A of the specific pixel 1 in FIG. 4 is completed, the processor 130 may move the specific pixel 1 in the vertical direction within the vertical moving range, based on the moving trajectory information corresponding to the moving range.

The processor 130 may move the specific pixel 1 in a vertical direction within the vertical moving range or horizontally within the horizontal moving range based on the moving path included in the moving trajectory information.

For example, the moving path included in the moving trajectory information may include information for information for moving the specific pixel 1 located at the starting point of the moving trajectory by pixel units (e.g., 1 pixel) in the vertical direction or moving by pixel units (e.g., 1 pixel) in the horizontal direction when the specific pixel 1 completes pixel shift according to any one of the plurality of moving trajectories.

In the plurality of image frames included in the second frame interval, the processor 130 may pixel-shift the moved specific pixel 1' according to a second moving trajectory B different from the first movement trajectory A.

For example, the processor 130 may pixel-shift the moved specific pixel 1' according to the second moving trajectory B based on the moving trajectory included in the moving trajectory information.

The moving trajectory included in the moving trajectory information may include a shift path that is a current location of a specific pixel (e.g., a location of a specific pixel moved by pixel units in the vertical direction according to the moving path, or a specific pixel moved by pixel units in the horizontal direction according to the moving path) is a starting point and an ending point. As illustrated in FIG. 5, the processor 130 may pixel-shift the specific pixel 1' moved in a plurality of image frames included in the second frame interval according to the second moving trajectory B based on the moving trajectory information. For example, the processor 130 may pixel-shift by pixel units in the first diagonal direction (e.g., the upper right direction).

When the moved specific pixel 1 reaches an upper end of the horizontal moving range or an upper side of the vertical moving range, the processor 130 may pixel-shift the moved specific pixel 1' in the third diagonal direction (e.g., lower right direction) by pixel units.

When the moved specific pixel 1' reaches a right side of the horizontal moving range or a lower end of the vertical moving range, the processor 130 may pixel-shift the moved specific pixel 1' in the second diagonal direction (e.g., lower left direction) by pixel units. When the moved specific pixel 1' reaches a left side of the horizontal moving range or a lower side of the vertical moving range, the processor 130 may pixel-shift the moved specific pixel 1' in the fourth diagonal direction (e.g., upper left direction) by pixel units.

As shown in FIG. 5, as the moved specific pixel 1' is pixel-shifted by pixel units in the first to fourth diagonal directions, the pixel shift may be performed according to a second trajectory different from the first moving trajectory A, and when the pixel shift according to the second moving trajectory B of the moved specific pixel 1' is completed, the processor 130 may move the moved specific pixel 1' located at a starting point of the second moving trajectory B by pixel units in the vertical direction within the vertical moving range.

As described above, the processor 130 may acquire i) a moving path and ii) a moving trajectory of the specific pixel based on the moving trajectory information stored in the memory 120, and then pixel-shift the specific pixel and all of the plurality of pixels constituting an image by using the acquired i) moving path and ii) moving trajectory.

Figure 6:
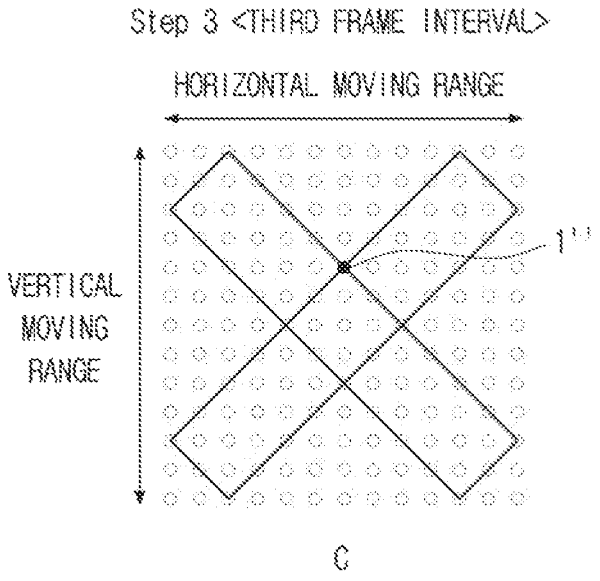
FIG. 6 is a view illustrating a third moving trajectory according to an embodiment.

FIG. 6 is a view illustrating a third moving trajectory according to an embodiment.

When the pixel shift according to the second moving trajectory B (refer to FIG. 5) of the specific pixel 1' is completed, the processor 130 may move the specific pixel 1' based on i) the moving path included in the moving trajectory information by pixel units in the vertical direction within the vertical moving range.

In the plurality of image frames included in a third frame interval, the processor 130 may pixel-shift a specific pixel 1" moved according to a third moving trajectory C based on the ii) moving trajectory included in the moving trajectory information.

Figure 7:
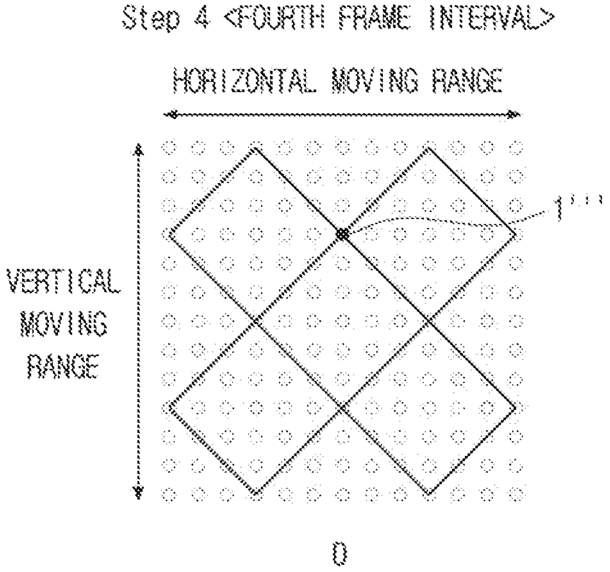
FIG. 7 is a view illustrating a fourth moving trajectory according to an embodiment.

FIG. 7 is a view illustrating a fourth moving trajectory according to an embodiment.

When the pixel shift according to the third moving trajectory C (refer to FIG. 6) of the specific pixel 1" is completed, the processor 130 may move the specific pixel 1" based on i) the moving path included in the moving trajectory information by pixel units in the vertical direction within the vertical moving range.

In the plurality of image frames included in a fourth frame interval, the processor 130 may pixel-shift a specific pixel 1''' moved according to the fourth moving trajectory D based on the ii) moving trajectory included in the moving trajectory information.

Figure 8:
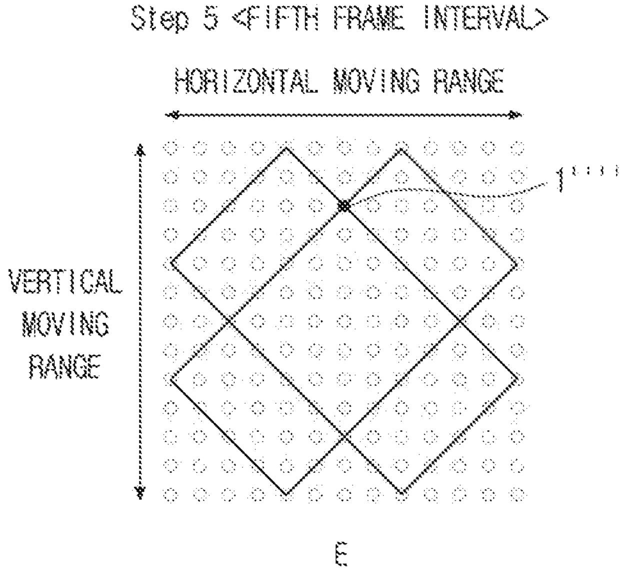
FIG. 8 is a view illustrating a fifth moving trajectory according to an embodiment.

FIG. 8 is a view illustrating a fifth moving trajectory according to an embodiment.

When the pixel shift according to the fourth moving trajectory D (refer to FIG. 7) of the specific pixel 1''' is completed, the processor 130 may move the specific pixel 1''' based on i) the moving path included in the moving trajectory information by pixel units in the vertical direction within the vertical moving range.

In the plurality of image frames included in a fifth frame interval, the processor 130 may pixel-shift a specific pixel 1"" moved according to the fifth moving trajectory E based on the ii) moving trajectory included in the moving trajectory information.

Figure 9:
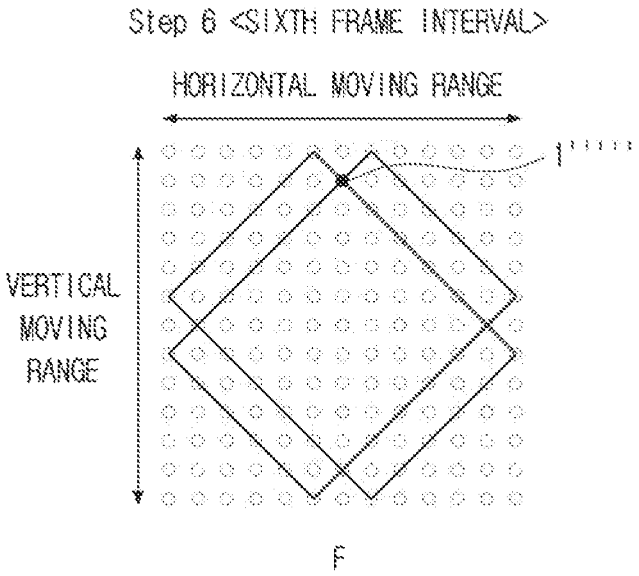
FIG. 9 is a view illustrating a sixth moving trajectory according to an embodiment.

FIG. 9 is a view illustrating a sixth moving trajectory according to an embodiment.

When the pixel shift according to the fifth moving trajectory E (refer to FIG. 8) of the specific pixel 1"" is completed, the processor 130 may move the specific pixel 1"" based on i) the moving path included in the moving trajectory information by pixel units in the vertical direction within the vertical moving range.

In the plurality of image frames included in a sixth frame interval, the processor 130 may pixel-shift a specific pixel 1"''' moved according to the sixth moving trajectory F based on the ii) moving trajectory included in the moving trajectory information.

Figure 10:
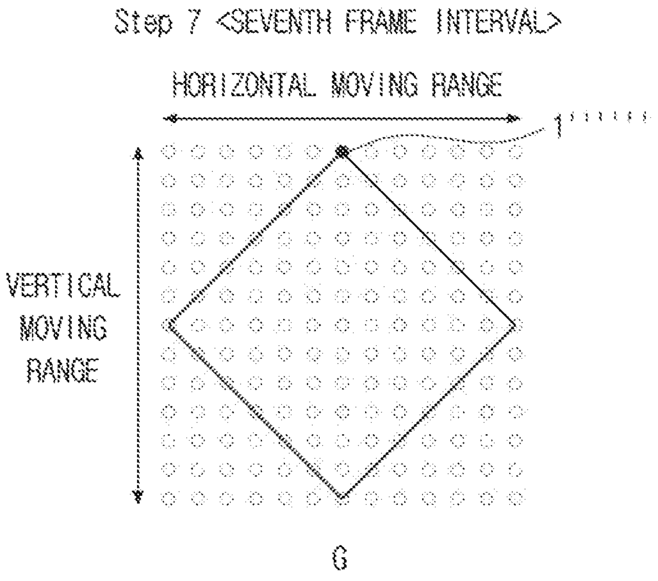
FIG. 10 is a view illustrating a seventh moving trajectory according to an embodiment.

FIG. 10 is a view illustrating a seventh moving trajectory according to an embodiment.

When the pixel shift according to the sixth moving trajectory F (refer to FIG. 9) of the specific pixel 1"''' is completed, the processor 130 may move the specific pixel 1''''' based on i) the moving path included in the moving trajectory information by pixel units in the vertical direction within the vertical moving range.

In the plurality of image frames included in a seventh frame interval, the processor 130 may pixel-shift a specific pixel 1'''''' moved according to a seventh moving trajectory G based on the ii) moving trajectory included in the moving trajectory information.

Figure 11:
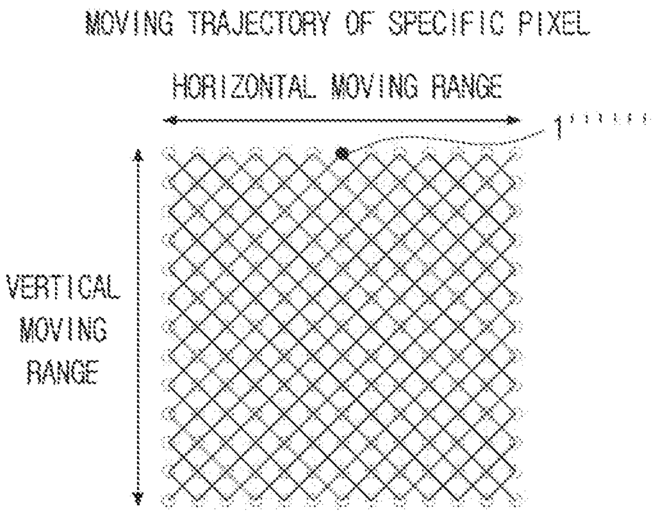
FIG. 11 is a view illustrating a moving trajectory of a specific pixel according to an embodiment.

FIG. 11 is a view illustrating a moving trajectory of a specific pixel according to an embodiment.

The processor 130 according to an embodiment may pixel-shift a specific pixel 1 according to ii) the moving trajectory included in the moving trajectory information in each of a plurality of frame intervals constituting an image, move the specific pixel 1 in the horizontal direction within the horizontal moving range according to the i) moving path included in the moving trajectory information between the plurality of frame interval, or shift the specific pixel 1 to a display location of all pixels included in the moving range by moving in the vertical direction within the vertical moving range.

Referring to FIG. 11, when a display location of the specific pixel 1 is overlapped according to the moving trajectory of the specific pixel 1 in each of the first frame interval to nth frame interval (e.g., the first frame interval to seventh frame interval as shown in FIGS. 4 to 10), as a plurality of image frames constituting an image are displayed, the specific pixel 1 may be located at least once in pixels (e.g., 13×13, total 169 pixels) included within the horizontal and vertical moving ranges.

When the specific pixel 1 is pixel-shifted according to the moving trajectory and the pixel shift according to the moving trajectory is completed, since the pixel is pixel-shifted according to different moving trajectories after being moved by pixel units in either the vertical or horizontal direction according to the moving path, the specific pixel 1 may be located at least once in a plurality of pixels included within the moving range, and stresses of the plurality of pixel elements constituting the display apparatus 100 may be appropriately distributed, and deterioration of the specific pixel element may be prevented.

Figure 12:
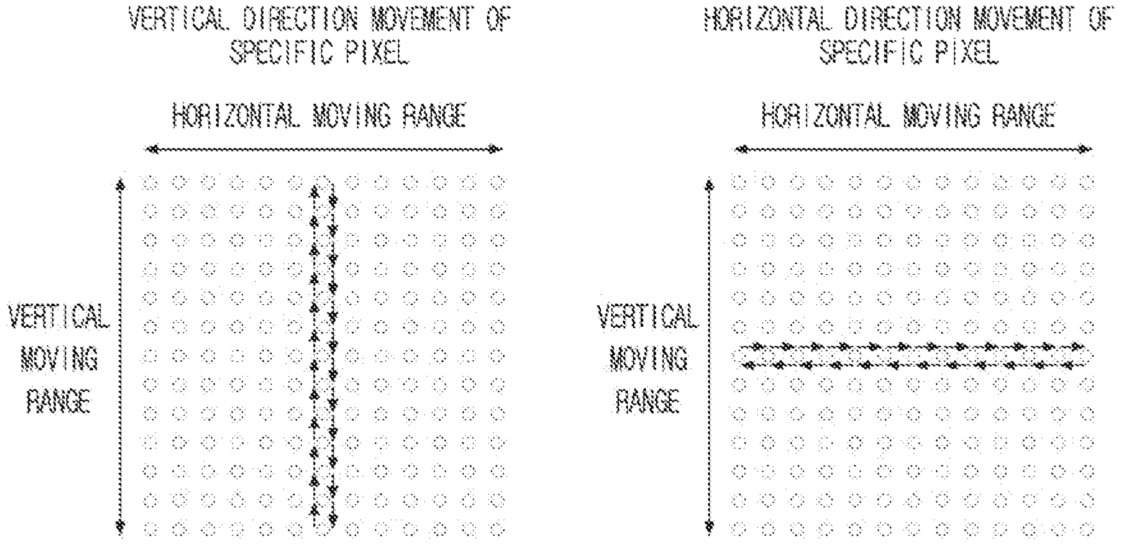
FIG. 12 is a view illustrating vertical movement and horizontal movement of a specific pixel according to an embodiment.

FIG. 12 is a view illustrating vertical movement and horizontal movement of a specific pixel according to an embodiment.

Referring to FIG. 12, when the pixel shift of the specific pixel 1 according to one moving trajectory is completed, the processor 130 may move the specific pixel 1 by pixel units in the vertical direction within the vertical moving range. For another example, when the pixel shift of the specific pixel 1 according to one moving trajectory is completed, the processor 130 may move the specific pixel 1 by pixel units in the horizontal direction within the horizontal moving range.

Figure 13:
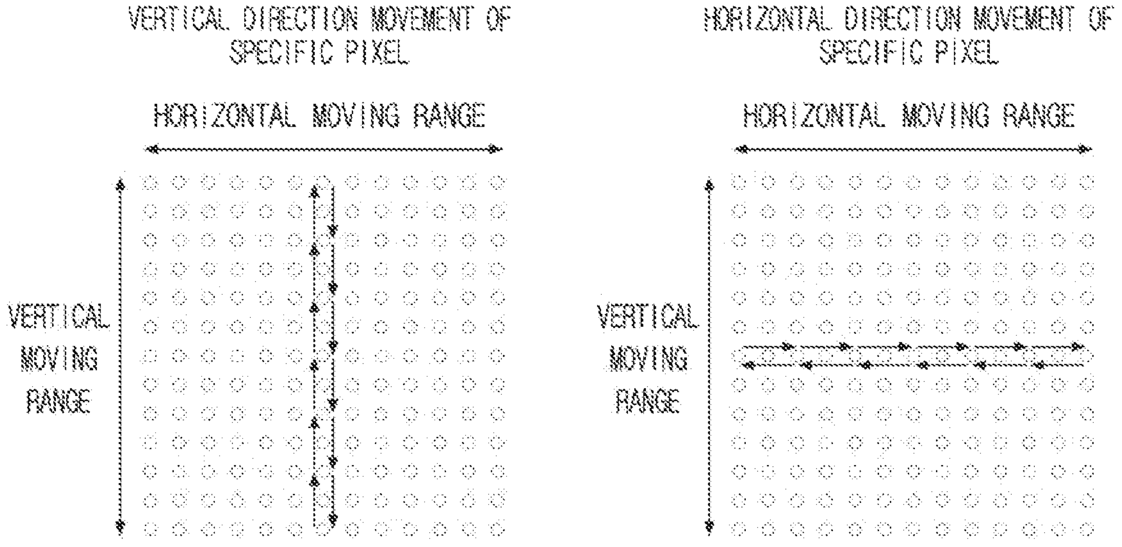
FIG. 13 is a view illustrating vertical movement and horizontal movement of a specific pixel according to another embodiment.

FIG. 13 is a view illustrating vertical movement and horizontal movement of a specific pixel according to another embodiment.

According to another embodiment of the disclosure, when the pixel shift of the specific pixel 1 according to one moving trajectory is completed, the processor 130 may move the specific pixel 1 by a predetermined pixel unit (e.g., 2 pixels) in the vertical direction within the vertical moving range. According to another embodiment of the disclosure, when the pixel shift of the specific pixel 1 according to one moving trajectory is completed, the processor 130 may move the specific pixel 1 by a predetermined pixel unit (e.g., 2 pixels) in the horizontal direction within the horizontal moving range. Information on the predetermined pixel unit may be included in the moving trajectory information.

For example, when the pixel shift of the specific pixel 1 according to one moving trajectory is completed, the processor 130 may, based on the moving trajectory information, move specific pixel 1 by a predetermined pixel unit (e.g., 2 pixels) in the vertical direction within the vertical moving range.

According to another embodiment of the disclosure, when the pixel shift according to any one of the moving trajectory is completed, the processor 130 may move the specific pixel 1 by a predetermined pixel unit (e.g., 2 pixels) in the horizontal direction within the vertical moving range, and pixel-shift the specific pixel 1 according to a different moving trajectory. A detailed description thereof will be described with reference to FIG. 13.

Figure 14:
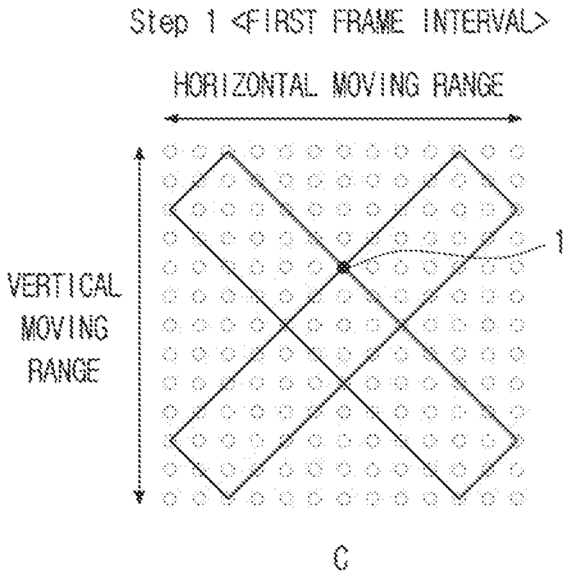
FIG. 14 is a view illustrating a third moving trajectory in a first frame interval according to an embodiment.

FIG. 14 is a view illustrating a third moving trajectory in a first frame interval according to an embodiment.

The processor 130 may acquire moving trajectory information corresponding to a moving range of the specific pixel 1 among plurality of moving trajectory information stored in the memory 120. For example, the processor 130 may acquire moving trajectory information corresponding to a moving range (e.g., 13×13) having a horizontal moving range of 13 pixels and a vertical moving range of 13 pixels.

In the plurality of image frames included in a first frame interval, the processor 130 may pixel-shift the specific pixel 1 according to the third moving trajectory C based on the ii) moving trajectory included in the moving trajectory information.

Comparing FIGS. 4 and 14, the display location of the specific pixel 1 in the first frame interval (e.g., the first frame interval) in a time sequence among the plurality of frame intervals constituting the image may correspond to an exact center (e.g., FIG. 4) within the moving range, but may correspond to a predetermined location (e.g., FIG. 14) within a moving range according to moving trajectory information.

Figure 15:
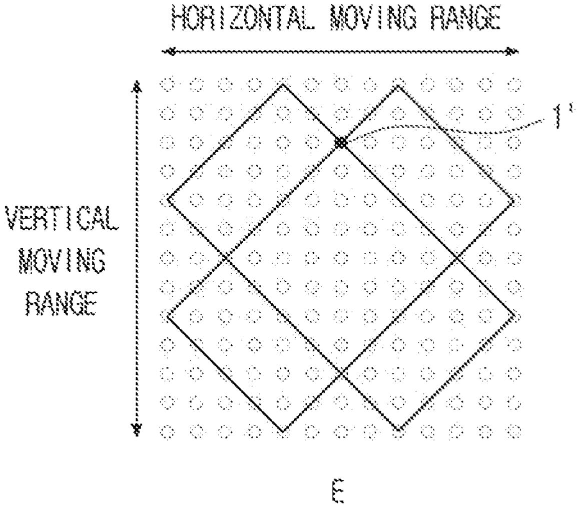
FIG. 15 is a view illustrating a fifth moving trajectory in a second frame interval according to an embodiment.

FIG. 15 is a view illustrating a fifth moving trajectory in a second frame interval according to an embodiment.

When the pixel shift according to the third moving trajectory C (refer to FIG. 14) of the specific pixel 1 is completed, the processor 130 may move the specific pixel 1 based on i) the moving path included in the moving trajectory information by the predetermined pixel units (e.g., 2 pixels upward) in the vertical direction within the vertical moving range.

In the plurality of image frames included in a second frame interval, the processor 130 may pixel-shift a specific pixel 1 moved according to the fifth moving trajectory E based on the ii) moving trajectory included in the moving trajectory information.

Figure 16:
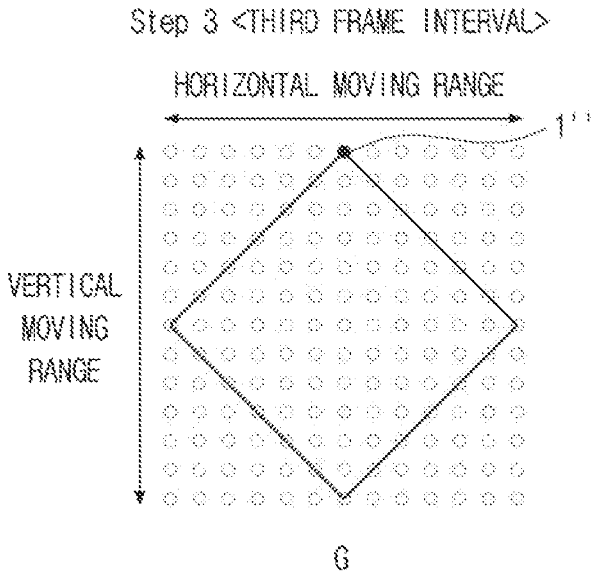
FIG. 16 is a view illustrating a seventh moving trajectory in a third frame interval according to an embodiment.

FIG. 16 is a view illustrating a seventh moving trajectory in a third frame interval according to an embodiment.

When the pixel shift according to the fifth moving trajectory E (refer to FIG. 15) of the specific pixel 1' is completed, the processor 130 may move the specific pixel 1' based on i) the moving path included in the moving trajectory information by the predetermined pixel units (e.g., 2 pixels upward) in the vertical direction within the vertical moving range.

In the plurality of image frames included in a third frame interval, the processor 130 may pixel-shift a specific pixel 1'' moved according to the seventh moving trajectory G based on the ii) moving trajectory included in the moving trajectory information.

Figure 17:
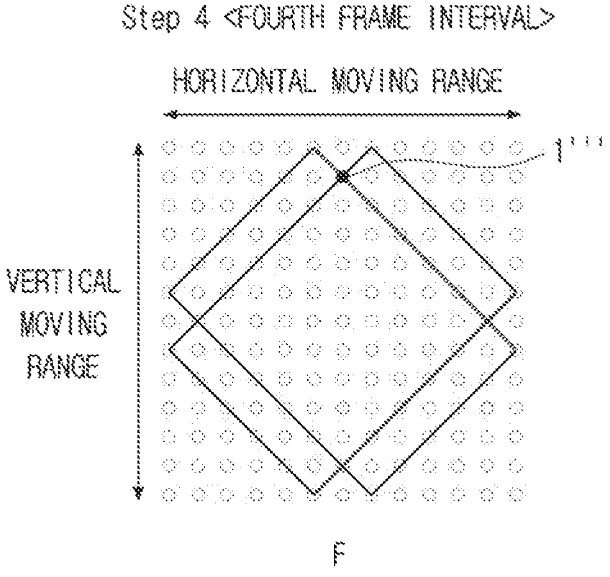
FIG. 17 is a view illustrating a sixth moving trajectory in a fourth frame interval according to an embodiment.

FIG. 17 is a view illustrating a sixth moving trajectory in a fourth frame interval according to an embodiment.

When the pixel shift according to the seventh moving trajectory G (refer to FIG. 16) of the specific pixel 1" is completed, the processor 130 may move the specific pixel 1" based on i) the moving path included in the moving trajectory information by the predetermined pixel units (e.g., 1 pixel downward) in the vertical direction within the vertical moving range.

In the plurality of image frames included in a fourth frame interval, the processor 130 may pixel-shift a specific pixel 1''' moved according to the sixth moving trajectory F based on the ii) moving trajectory included in the moving trajectory information.

Figure 18:
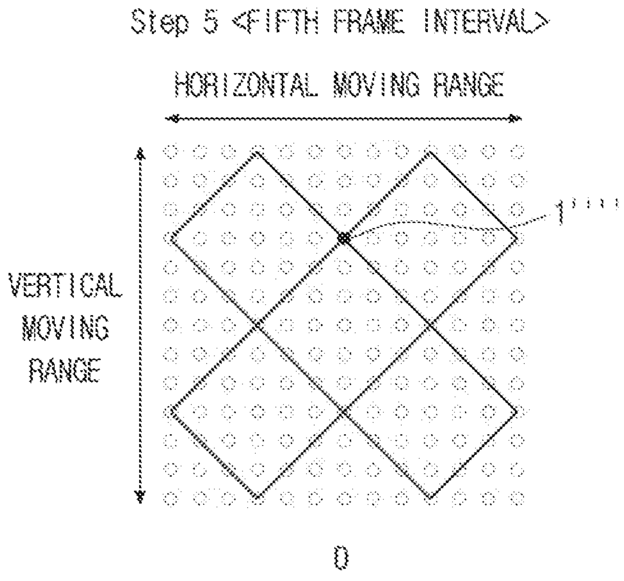
FIG. 18 is a view illustrating a fourth moving trajectory in a fifth frame interval according to an embodiment.

FIG. 18 is a view illustrating a fourth moving trajectory in a fifth frame interval according to an embodiment.

When the pixel shift according to the sixth moving trajectory F (refer to FIG. 17) of the specific pixel 1''' is completed, the processor 130 may move the specific pixel 1" based on i) the moving path included in the moving trajectory information by the predetermined pixel units (e.g., 2 pixels downward) in the vertical direction within the vertical moving range.

In the plurality of image frames included in a fifth frame interval, the processor 130 may pixel-shift a specific pixel 1'''' moved according to the fourth moving trajectory D based on the ii) moving trajectory included in the moving trajectory information.

Figure 19:
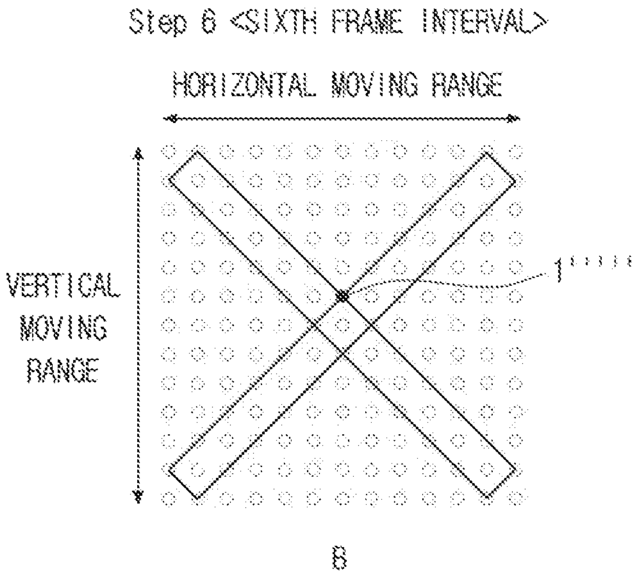
FIG. 19 is a view illustrating a second moving trajectory in a sixth frame interval according to an embodiment.

FIG. 19 is a view illustrating a second moving trajectory in a sixth frame interval according to an embodiment.

When the pixel shift according to the fourth moving trajectory D (refer to FIG. 18) of the specific pixel 1'''' is completed, the processor 130 may move the specific pixel 1'''' based on i) the moving path included in the moving trajectory information by the predetermined pixel units (e.g., 2 pixels downward) in the vertical direction within the vertical moving range.

In the plurality of image frames included in a sixth frame interval, the processor 130 may pixel-shift a specific pixel 1''''' moved according to the second moving trajectory B based on the ii) moving trajectory included in the moving trajectory information.

Meanwhile, as illustrated in FIGS. 14 to 19, the moving path of the specific pixel 1 (e.g., 2 pixels upward→2 pixels upward→1 pixel downward→2 pixels downward) and the order of the moving trajectories (e.g., third moving trajectory→fifth moving trajectory→seventh moving trajectory→sixth moving trajectory→fourth moving trajectory→second moving trajectory) may be included in the moving trajectory information.

As another example, in addition to the moving trajectory information pre-stored in the memory 120, the processor 130 may pixel-shift the specific pixel 1 by identifying the moving range, the moving path, and the moving trajectory.

Referring to FIG. 4, the horizontal moving range and the vertical moving range within the moving range of the specific pixel 1 may be the same. Accordingly, as illustrated in FIG. 4, the moving range of the specific pixel 1 may be in a square shape.

In that configuration, the processor 130 may pixel-shift the specific pixel 1 according to the first moving trajectory in the plurality of image frames included in the first frame interval based on a center within the moving range. The first moving trajectory may be the same as the moving trajectory shown in FIG. 4. The center within the moving range may refer to a location at which the specific pixel 1 is displayed (a current location of the specific pixel before performing the pixel shift).

When the pixel shift according to the first moving trajectory A of the specific pixel 1 is completed, the processor 130 may move the specific pixel 1 by pixel units in the vertical direction within the vertical moving range.

Referring to FIG. 5, the processor 130 may pixel-shift a moved specific pixel 1' in the plurality of image frames included in the second frame interval according to the second moving trajectory B. The second moving trajectory may be the same as the moving trajectory shown in FIG. 5.

When the pixel shift according to the second moving trajectory B of the moved specific pixel 1' is completed, the processor 130 may re-move the moved specific pixel 1' by pixel units in the vertical direction within the vertical moving range.

Referring to FIG. 6, the processor 130 may pixel-shift the re-moved specific pixel 1" in the plurality of image frames included in the third frame interval according to the third moving trajectory C. The third moving trajectory may be the same as the moving trajectory shown in FIG. 6.

Referring to FIGS. 4 to 10, according to another embodiment of the disclosure, the processor 130 may identify whether a moving trajectory corresponds to a predetermined moving trajectory. As an example, the processor 130 may identify whether the moving trajectory is configured as the same trajectory.

The moving trajectory composed of the same trajectory may refer to the first moving trajectory A of FIG. 4. The first moving trajectory A of FIG. 4 may not include the moving trajectory of the specific pixel 1 which is a rectangle rotated by 45 degrees or a square rotated by 45 degrees, etc., and may be a trajectory composed only of straight lines.

When an overlapping trajectory (or a repeated trajectory or the same trajectory) is identified within the moving trajectory of the specific pixel 1, the processor 130 according to an embodiment may skip the corresponding moving trajectory.

Referring to FIG. 4, according to an embodiment, when a moving trajectory composed of the same trajectory as the first moving trajectory A is identified, the processor 130 may skip the moving trajectory. The processor 130 may move the specific pixel 1 in any one direction of the vertical moving path or the horizontal moving path by pixel units.

The processor 130 may identify whether the moving trajectory of the moved specific pixel is configured as the same trajectory. If the moving trajectory is not configured with the same trajectory (e.g., not a trajectory composed of only straight lines), the processor 130 may pixel-shift a specific pixel according to the corresponding moving trajectory.

Meanwhile, when the processor 130 skips a moving trajectory composed of the same trajectory, the processor 130 may display an image while maintaining the current location of the specific pixel for a predetermined image frame (e.g., for a predetermined time), rather than immediately moving the specific pixel by pixel units in any one direction of the vertical moving path or the horizontal moving path.

The processor 130 may move the specific pixel in any one direction of the vertical moving path or the horizontal moving path by pixel units.

Referring to FIG. 5, the processor 130 may skip the pixel shift according to the first moving trajectory A and move, after displaying an image, the specific pixel by pixel units in the vertical direction while maintaining the current location of the specific pixel for a predetermined image frame (e.g., for a predetermined time).

The processor 130 may pixel-shift the image according to the second moving trajectory B since the second moving trajectory B does not have the same trajectory. The processor 130 may move the specific pixel by pixel units in the vertical direction, and may shift the pixel according to the third moving trajectory C.

According to an embodiment, the processor 130 may pixel-shift the image according to an order (B→C→D→E→F→G) of the seventh moving trajectory G from the second moving trajectory B, and may pixel-shift the image according to an order (G→F→E→D→C→B) of the second moving trajectory B from the seventh moving trajectory G. Instead of pixel-shifting the image according to the first moving trajectory A, the processor 130 may display the image while maintaining the image for a predetermined image frame in a reference point (a pixel located in the center of the plurality of pixels within the moving range of the specific pixel) of the first moving trajectory A.

For another example, the processor 130 may skip the first moving trajectory A composed of the same trajectory, and may move the specific pixel by a predetermined pixel unit (e.g., 1 pixel) in the vertical direction from the reference point of the first moving trajectory A and then display the image while maintaining (or fixing) the location of the specific pixel for a predetermined image frame. The processor 130 may move the specific pixel by pixel units in the vertical direction and then pixel-shift the image according to the third moving trajectory C.

The processor 130 may display the image while maintaining (or fixing) the location of the specific pixel for a predetermined image frame after moving the specific pixel in the vertical direction by pixel units. The processor 130 may move the specific pixel by pixel units in the vertical direction and then pixel-shift the image according to the third moving trajectory C. Accordingly, the processor 130 may pixel-shift the image according to an order of the third moving trajectory C→fifth moving trajectory E→seventh moving trajectory G as illustrated in FIGS. 14 to 19, and then pixel-shift the image according to an order of the sixth moving trajectory F→fourth moving trajectory D→second moving trajectory B.

Figure 20:
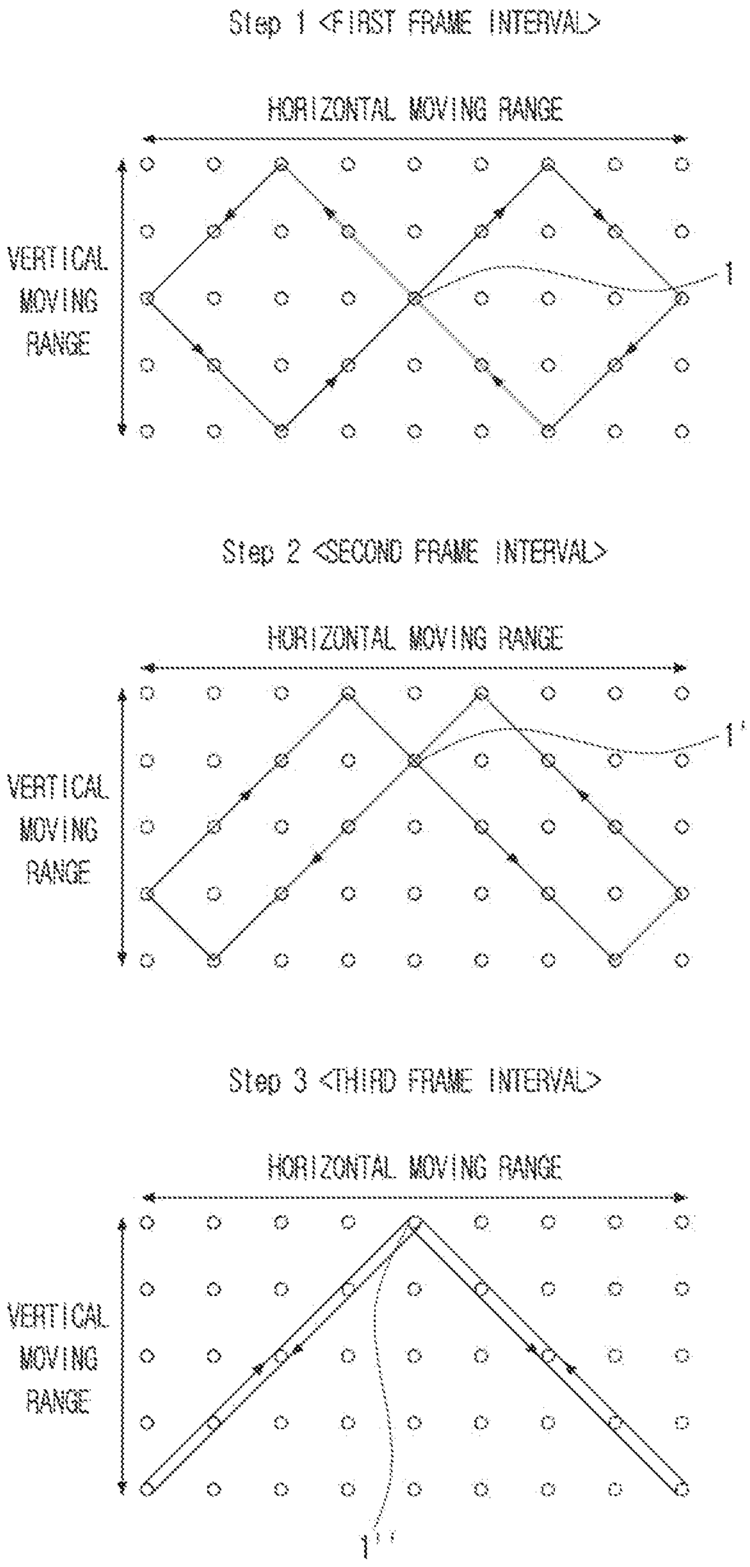
FIG. 20 is a view illustrating a plurality of moving trajectories of a specific pixel according to another embodiment.

FIG. 20 is a view illustrating a plurality of moving trajectories of a specific pixel according to another embodiment.

According to another embodiment, the horizontal moving range and the vertical moving range within the moving range may be integer multiples.

For example, the horizontal moving range may be 9 pixels, and the vertical moving range may be 5 pixels. When Equations 1 and 2 are satisfied, the processor 130 may identify that any one of the number of pixels included in the horizontal moving range and the number of pixels included in the vertical moving range is an integer multiple of the other.

(Number of pixels included in horizontal moving range−1)=$N$*(Number of pixels included in vertical moving range−1) [Equation 1]

(Number of pixels included in vertical moving range−1)=$N$*(Number of pixels included in horizontal moving range−1) [Equation 2]

According to an embodiment, if any one of the number of pixels included in the horizontal moving range and the number of pixels included in the vertical moving range is an integer multiple of the other, the processor 130 may locate the specific pixel 1 at least once in every pixel in the moving range by moving the specific pixel 1 at least once in the horizontal direction within the vertical moving range or at least once in the vertical direction within the horizontal moving range.

A detailed description thereof will be made with reference to FIGS. 20 to 22.

Referring to FIG. 20, when the horizontal moving range and the vertical moving range within the moving range of the specific pixel 1 are related to integer multiple, the moving range of the specific pixel 1 may have a rectangular shape.

In that configuration, the processor 130 may pixel-shift the specific pixel 1 according to the first moving trajectory in the plurality of image frames included in the first frame interval based on a center within the moving range. The first moving trajectory may be the same as the moving trajectory shown in an upper part of FIG. 20.

When the pixel shift according to the first moving trajectory of the specific pixel 1 is completed, the processor 130 may move the specific pixel 1 by pixel units in the vertical direction within the vertical moving range. For example, the processor 130 may move the specific pixel 1 upward within the vertical moving range by pixel units.

The processor 130 may pixel-shift a specific pixel 1' moved in the plurality of image frames included in a second frame interval according to a second moving trajectory. Here, the second moving trajectory may be the same as the moving trajectory shown in a center of FIG. 20.

When the pixel shift according to the second moving trajectory of the moved specific pixel 1' is completed, the processor 130 may re-move the moved specific pixel 1' by pixel units in the vertical direction within the vertical moving range. For example, the processor 130 may move the moved specific pixel 1' upward within the vertical moving range by pixel units.

The processor 130 may pixel-shift the re-moved specific pixel 1" in the plurality of image frames included in a third frame interval according to a third moving trajectory. The third moving trajectory may be the same as the moving trajectory shown in a lower part of FIG. 20.

Even if the specific pixel 1 is pixel-shifted according to the first moving trajectory and the third moving trajectory, the specific pixel 1 may not be located at least once at all pixels (45 pixels in total) within the horizontal moving range (e.g., 9 pixels) and the vertical moving range (e.g., 5 pixels).

When the pixel shift according to the third moving trajectory of the re-moved specific pixel 1" is completed, the processor 130 may re-move the re-moved specific pixel 1" by pixel units in the vertical direction within the vertical moving range. For example, the processor 130 may move the re-moved specific pixel 1" downward within the vertical moving range by pixel units.

Figure 21:
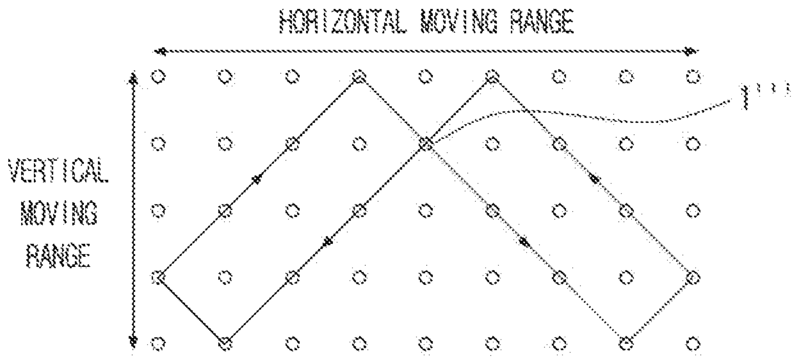
FIG. 21 is a view illustrating a plurality of moving trajectories of a specific pixel according to another embodiment.
Figure 21:
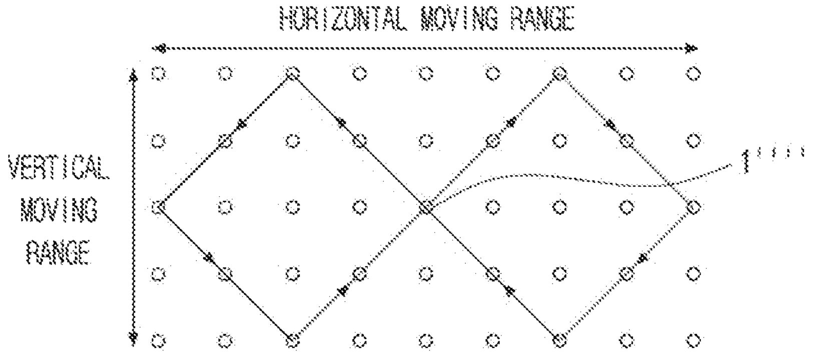

FIG. 21 is a view illustrating a plurality of moving trajectories of a specific pixel according to another embodiment.

Referring to FIG. 21, the processor 130 may pixel-shift the moved specific pixel 1''' downward (hereinafter, referred to as a third-moved specific pixel) according to the fourth moving trajectory in the plurality of image frames included in the fourth frame interval. The fourth moving trajectory may be the same as the second moving trajectory.

When the pixel shift according to the fourth moving trajectory of the third-moved specific pixel 1''' is completed, the processor 130 may re-move the third-moved specific pixel 1''' by pixel units in the vertical direction within the vertical moving range. For example, the processor 130 may move the third-moved specific pixel 1''' downward within the vertical moving range by pixel units (hereinafter, referred to as a fourth-moved specific pixel 1'''').

The processor 130 may pixel-shift the fourth-moved specific pixel 1'''' in the plurality of image frames included in a fifth frame interval according to a fifth moving trajectory. The fifth moving trajectory may be the same as the first moving trajectory.

Figure 22:
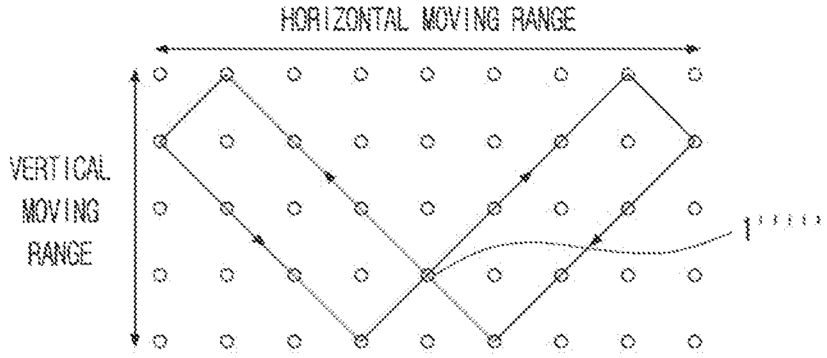
FIG. 22 is a view illustrating a plurality of moving trajectories of a specific pixel according to another embodiment.
Figure 22:
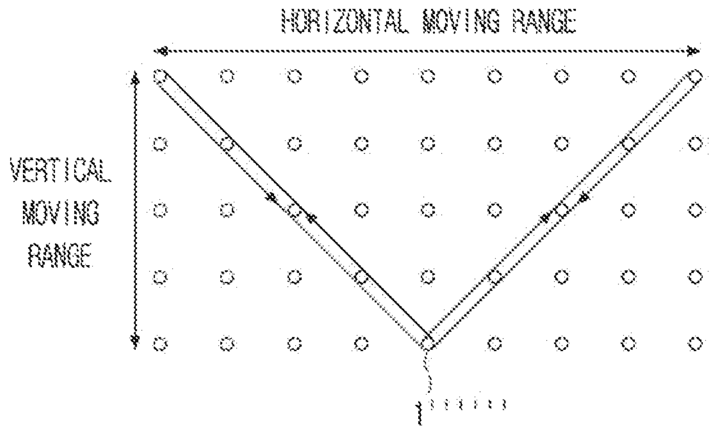

FIG. 22 is a view illustrating a plurality of moving trajectories of a specific pixel according to another embodiment.

Referring to FIG. 22, when the pixel shift according to the fifth moving trajectory of the fourth-moved specific pixel 1'''' is completed, the processor 130 may re-move the fourth-moved specific pixel 1'''' by pixel units in the vertical direction within the vertical moving range. For example, the processor 130 may move the fourth-moved specific pixel 1'''' downward within the vertical moving range by pixel units (hereinafter, referred to as a fifth-moved specific pixel 1''''').

The processor 130 may pixel-shift the fifth-moved specific pixel 1''''' in the plurality of image frames included in a sixth frame interval according to a sixth moving trajectory.

When the pixel shift according to the sixth moving trajectory of the fifth-moved specific pixel 1''''' is completed, the processor 130 may re-move the fifth-moved specific pixel 1''''' by pixel units in the vertical direction within the vertical moving range. For example, the processor 130 may move the fifth-moved specific pixel 1''''' downward within the vertical moving range by pixel units (hereinafter, referred to as a sixth-moved specific pixel 1'''''').

The processor 130 may pixel-shift the sixth-moved specific pixel 1'''''' in the plurality of image frames included in a seventh frame interval according to a seventh moving trajectory.

Figure 23:
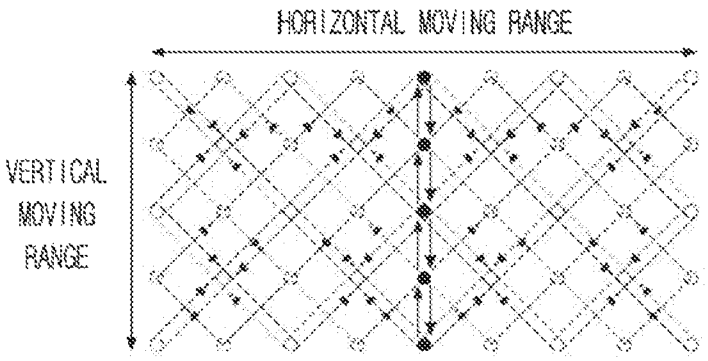
FIG. 23 is a view illustrating vertical movement of a specific pixel according to another embodiment.
Figure 23:
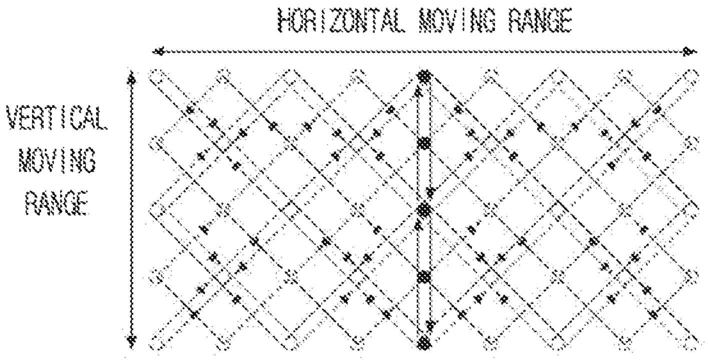
Figure 24:
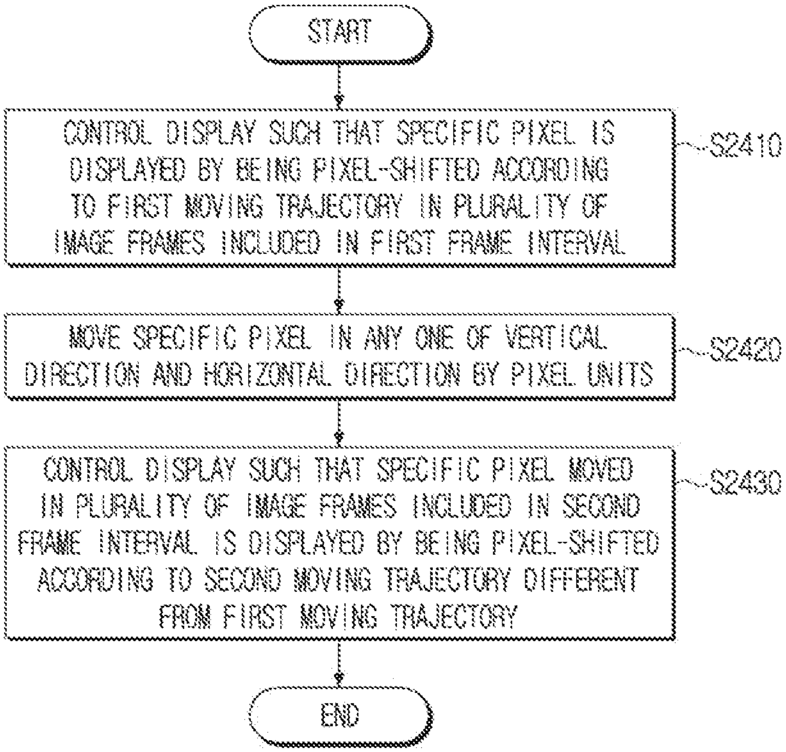
FIG. 24 is a flowchart illustrating an example method of controlling a display apparatus according to an embodiment.

Here, a display location of the specific pixels 1 according to the first to seventh moving trajectories are overlapped is illustrated in FIG. 23.

FIG. 23 is a view illustrating vertical movement of a specific pixel according to another embodiment; and Referring to FIG. 13, the specific pixel 1 may be located at least once in all pixels (45 pixels in total) included in the horizontal moving range (e.g., 9 pixels) and the vertical moving range (e.g., 5 pixels), and a vertical moving path of the specific pixel 1 between the plurality of frame intervals may correspond to a vertical moving range as illustrated in FIG. 13.

For another example, the processor 130 may move the specific pixel 1 in the horizontal direction within the vertical moving range. In that configuration, the horizontal moving path of the specific pixel 1 between the plurality of frame intervals may correspond to the horizontal moving range.

For another example, the processor 130 may move the specific pixel 1 by pixel units (e.g., 1 pixel) between the plurality of frame intervals, or move the specific pixel 1 by a predetermined pixel unit (e.g., 2 pixels).

Referring to FIGS. 20 to 22, if any one of the horizontal moving range and the vertical moving range is an integer multiple of the other one (i.e., if the moving range has a rectangular shape), the processor 130 may locate the specific pixel 1 at least once in all pixels included in the moving range by moving within the vertical moving range or within the horizontal moving range.

As illustrated in FIGS. 20 to 22, when the specific pixel 1 is moved between frame intervals, the processor 130 may move the specific pixel 1 vertically or horizontally by 1 pixel such that the user cannot easily see it.

Directions of arrows shown in each of the plurality of moving trajectories in the above drawings are shown for convenience of descriptions for a shift order of the specific pixel 1 (e.g., pixel-shift from a first diagonal direction to a fourth diagonal direction), and are not limited thereto.

In the above drawings, vertical or horizontal movement of the specific pixel 1 between frame intervals is merely illustrated for convenience of description and is not limited thereto.

For example, as Step 1 to Step 7 of FIGS. 20 to 22, after the specific pixel 1 moves upward within the vertical moving range, the specific pixel 1 may move downward, and conversely, after the specific pixel 1 moves downward within the vertical moving range, the specific pixel 1 may move upward.

For example, the processor 130 may move the specific pixel 1 in an order of Step 1→Step 6→Step 7→Step 6→Step 1→Step 2→Step 3, and may pixel-shift the specific pixel 1 in each Step.

As illustrated in the drawing describing the moving trajectory of the specific pixel 1, each of the plurality of moving trajectories may be configured by a combination of at least one of a straight line, a rectangle rotated by 45 degrees, or a square rotated by 45 degrees.

FIG. 9 is a flowchart illustrating a method of controlling an electronic apparatus according to an embodiment.

In operation S2410, a method of controlling a display apparatus including moving trajectory information related to a plurality of moving trajectories according to an embodiment of the disclosure, may control the display such that a specific pixel is displayed by being pixel-shifted according to a first moving trajectory among a plurality of moving trajectories based on moving trajectory information in a plurality of image frames included in a first frame interval.

In operation S2420, when the pixel shift according to the first moving trajectory is completed, a specific pixel located at a starting point of the first moving trajectory may be moved in either a vertical direction or a horizontal direction by pixel units.

In operation S2430, the display may be controlled such that the specific pixel is displayed by being pixel-shifted according to the second moving trajectory among the plurality of moving trajectories based on moving trajectory information in the plurality of image frames included in a second frame interval.

The control method according to an embodiment may further include an operation of setting a moving range of the specific pixel based on a location at which the specific pixel is displayed, and the operation S2420 of moving may include, when the pixel shift according to any one of the plurality of moving trajectories is completed, moving the specific pixel by pixel units in any one of the vertical direction and horizontal direction within a predetermined moving range.

The operation S2410 of controlling the display in the plurality of image frames included in the first frame interval may include pixel-shifting the specific pixel by pixel units in a first diagonal direction in a plurality of image frames included in the first frame interval, and when the shifted specific pixel reaches the moving range, pixel-shifting the specific pixel by pixel units in a second diagonal direction to pixel-shift the specific pixel according to the first moving trajectory.

The operation S2430 of controlling the display in the plurality of image frames included in the second frame interval may include pixel-shifting the specific pixel by pixel units in a third diagonal direction in a plurality of image frames included in the second frame interval, and when the shifted specific pixel reaches the moving range, pixel-shifting the specific pixel by pixel units in a fourth diagonal direction to pixel-shift the specific pixel according to the second moving trajectory.

The moving range of the specific pixel according to an embodiment of the disclosure may include a horizontal moving range and a vertical moving range determined based on a display location of the specific pixel, and the operation S2420 of moving may include moving, when the pixel shift according to the first moving trajectory is completed, the specific pixel located at a starting point of the first moving trajectory in the horizontal direction within the horizontal moving range, and wherein the control method may further include when pixel shifting according to the second moving trajectory is completed, moving the specific pixel located at the starting point of the second moving trajectory in the horizontal direction within the horizontal moving range, and by pixel-shifting the specific pixel according to each of a plurality of moving trajectories corresponding to the moving range, shifting the specific pixel to shift to a display location of pixels included in the moving range.

The moving range of the specific pixel according to an embodiment of the disclosure may include a horizontal moving range and a vertical moving range determined based on a display location of the specific pixel, and the operation S2420 of moving may include moving, when the pixel shift according to the first moving trajectory is completed, the specific pixel located at a starting point of the first moving trajectory in the vertical direction within the vertical moving range, and wherein the control method may further include when pixel shifting according to the second moving trajectory is completed, moving the specific pixel located at the starting point of the second moving trajectory in the vertical direction within the vertical moving range, and by pixel-shifting the specific pixel according to each of a plurality of moving trajectories corresponding to the moving range, shifting the specific pixel to shift to a display location of pixels included in the moving range.

The control method according to the disclosure may further include, when any one of the number of pixels included in the horizontal moving range and the number of pixels included in the vertical moving range of the moving range is an integer multiple, identifying a moving trajectory corresponding to a moving range of the specific pixel based on the moving trajectory information, and controlling the display to shift and display the specific pixel based on the identified moving trajectory.

In addition, each of the first moving trajectory and the second moving trajectory may be configured as a combination of at least one of a straight line, a rectangle rotated by 45 degrees, and a square rotated by 45 degrees.

A specific pixel according to the disclosure may be moved only in a horizontal direction or only in a vertical direction within a moving range of a specific pixel between a plurality of frame intervals included in an image.

However, various embodiments of the disclosure may be applied to all types of electronic apparatuses including displays as well as electronic apparatuses.

In addition, according to an embodiment, various embodiments described above may be implemented in a recording media that may be read by a computer or a similar device to the computer by suing software, hardware, or a combination thereof. In some cases, the embodiments described herein may be implemented by the processor itself. In a software configuration, various embodiments described in the specification such as a procedure and a function may be implemented as separate software modules. The software modules may respectively perform one or more functions and operations described in the disclosure According to various embodiments described above, computer instructions for performing processing operations of a device according to the various embodiments described above may be stored in a non-transitory computer-readable medium. The computer instructions stored in the non-transitory computer-readable medium may cause a particular device to perform processing operations on the device according to the various embodiments described above when executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

While the disclosure has been illustrated and described with reference to various example embodiments, it will be understood that the various example embodiments are intended to be illustrative, not limiting. It will be understood by those skilled in the art that many alternatives, modifications, and variations may be made without departing from the true spirit and full scope of the disclosure, including the appended claims and their equivalents.

What is claimed is:

1. A display apparatus comprising:
- a display; and
- a processor configured to:
  - control the display to display at least one pixel which is shifted according to a first moving trajectory among a plurality of moving trajectories,
  - based on the at least one pixel returning to a starting point of the first moving trajectory, move the at least one pixel in any one of a vertical direction and a horizontal direction, and
  - control the display to display the at least one pixel by being shifted according to a second moving trajectory among the plurality of moving trajectories.

2. The display apparatus of claim 1, wherein the processor is configured to set a moving range of the at least one pixel based on a location in which the at least one pixel is displayed, and
- based on the at least one pixel returning to the starting point of the first moving trajectory by being shifted according to the first moving trajectory, move the at least one pixel by pixel units in any one of a vertical direction and a horizontal direction within the set moving range.

3. The display apparatus of claim 2, wherein the processor is configured to:
- shift the at least one pixel according to the first moving trajectory by shifting the at least one pixel by pixel units in a first diagonal direction and, based on the at least one pixel reaching the moving range, shifting the at least one pixel by pixel units in a second diagonal direction.

4. The display apparatus of claim 3, wherein the processor is configured to shift the at least one pixel according to the second moving trajectory by shifting the at least one pixel by pixel units in a third diagonal direction and, based on the at least one pixel reaching the moving range, shifting the at least one pixel by pixel units in a fourth diagonal direction.

5. The display apparatus of claim 3, wherein the moving range of the at least one pixel comprises a horizontal moving range and a vertical moving range set based on the location in which the at least one pixel is displayed, and wherein the processor is configured to, based on completing of the at least one pixel being shifted according to the first moving trajectory, move the at least one pixel located at the starting point of the first moving trajectory in a horizontal direction within the horizontal moving range, based on completing of the at least one pixel being shifted according to the second moving trajectory, move the at least one pixel located at a starting point of the second moving trajectory in the horizontal direction within the horizontal moving range, and shift the at least one pixel to a respective display location of pixels included in the moving range by shifting the at least one pixel according to each of the plurality of moving trajectories corresponding to the moving range.

6. The display apparatus of claim 3, wherein the moving range of the at least one pixel comprises a horizontal moving range and a vertical moving range set based on the location in which the at least one pixel is displayed, and wherein the processor is configured to, based on completing of the at least one pixel being shifted according to the first moving trajectory, move the at least one pixel located at the starting point of the first moving trajectory in a vertical direction within the vertical moving range, based on completing of the at least one pixel being shifted according to the second moving trajectory, move the at least one pixel located at a starting point of the second moving trajectory in a vertical direction within the vertical moving range, and shift the at least one pixel to a respective display location of pixels included in the moving range by shifting the at least one pixel according to each of the plurality of moving trajectories corresponding to the moving range.

7. The display apparatus of claim 2, wherein the processor is configured to, based on that either a number of pixels included in the horizontal moving range or a number of pixels included in the vertical moving range of the moving range is an integer multiple of the other, identify a moving trajectory corresponding to the moving range of the at least one pixel based on moving trajectory information related to the plurality of moving trajectories, and shift the at least one pixel based on the identified moving trajectories.

8. The display apparatus of claim 1, wherein each of the first moving trajectory and the second moving trajectory is configured to be composed of a combination of at least one of a straight line, a rectangle rotated 45 degrees, or a square rotated 45 degrees.

9. The display apparatus of claim 1, wherein the processor is configured to move the at least one pixel only in the horizontal direction or only in the vertical direction within a moving range between a plurality of frame intervals included in an image.

10. The display apparatus of claim 1, wherein the processor is configured to, based on the second moving trajectory corresponding to a preset moving trajectory, control the display to display the at least one pixel by maintaining a location of the at least one pixel, and after re-moving the at least one pixel by pixel units in any one of the vertical direction and the horizontal direction, control the display to display the at least one pixel by being shifted according to a third moving trajectory.

11. The display apparatus of claim 1, wherein the display is configured to be implemented as a self-luminous display.

12. A method of controlling a display apparatus, the method comprising:

controlling a display to display at least one pixel which is shifted according to a first moving trajectory among a plurality of moving trajectories;

based on the at least one pixel returning to a starting point of the first moving trajectory, moving the at least one pixel in any one of a vertical direction and a horizontal direction; and controlling the display to display the at least one pixel by being shifted according to a second moving trajectory among the plurality of moving trajectories.

13. The method of claim 12, further comprising:

setting a moving range of the at least one pixel based on a location in which the at least one pixel is displayed, and wherein the moving includes, based on the at least one pixel returning to the starting point of the first moving trajectory by being shifted according to the first moving trajectory, moving the at least one pixel by pixel units in any one of a vertical direction and a horizontal direction within the set moving range.

14. The method of claim 13, wherein the controlling the display includes shifting the at least one pixel according to the first moving trajectory by shifting the at least one pixel by pixel units in a first diagonal direction and, based on the at least one pixel reaching the moving range, shifting the at least one pixel by pixel units in a second diagonal direction.

15. The method of claim 14, wherein the controlling the display includes shifting the at least one pixel according to the second moving trajectory by shifting the at least one pixel by pixel units in a third diagonal direction and, based on the at least one pixel reaching the moving range, shifting the at least one pixel by pixel units.

16. The method of claim 14, wherein the moving range of the at least one pixel comprises a horizontal moving range and a vertical moving range set based on the location in which the at least one pixel is displayed, and wherein the moving includes, based on completing of the at least one pixel being shifted according to the first moving trajectory, moving the at least one pixel located at the starting point of the first moving trajectory in a horizontal direction within the horizontal moving range, wherein the method further comprising:

based on completing of the at least one pixel being shifted according to the second moving trajectory, moving the at least one pixel located at a starting point of the second moving trajectory in the horizontal direction within the horizontal moving range, and shifting the at least one pixel to a respective display location of pixels included in the moving range by shifting the at least one pixel according to each of the plurality of moving trajectories corresponding to the moving range.

17. The method of claim 14, wherein the moving range of the at least one pixel comprises a horizontal moving range and a vertical moving range set based on the location in which the at least one pixel is displayed, and wherein the moving includes, based on completing of the at least one pixel being shifted according to the first moving trajectory, move the at least one pixel located at the starting point of the first moving trajectory in a vertical direction within the vertical moving range, wherein the method further comprising:

based on completing of the at least one pixel being shifted according to the second moving trajectory, moving the at least one pixel located at a starting point of the second moving trajectory in a vertical direction within the vertical moving range, and shifting the at least one pixel to a respective display location of pixels included in the moving range by shifting the at least one pixel according to each of the plurality of moving trajectories corresponding to the moving range.

18. The method of claim 13, further comprising:

wherein, based on that either a number of pixels included in the horizontal moving range or a number of pixels included in the vertical moving range of the moving range is an integer multiple of the other, identifying a moving trajectory corresponding to the moving range of the at least one pixel based on moving trajectory information related to the plurality of moving trajectories, and shifting the at least one pixel based on the identified moving trajectories.

19. The method of claim 12, wherein each of the first moving trajectory and the second moving trajectory is configured to be composed of a combination of at least one of a straight line, a rectangle rotated 45 degrees, or a square rotated 45 degrees.

20. The method of claim 12, wherein the moving includes moving the at least one pixel only in the horizontal direction or only in the vertical direction within a moving range between a plurality of frame intervals included in an image.

* * * * *